United States Patent [19]
Shinohara et al.

[11] Patent Number: 5,933,188
[45] Date of Patent: Aug. 3, 1999

[54] PHOTOELECTRIC CONVERSION APPARATUS AND METHOD WITH RESET

[75] Inventors: Mahito Shinohara, Tokyo; Isamu Ueno, Hadano, both of Japan

[73] Assignee: Canon Kabushiki Kaisha, Tokyo, Japan

[21] Appl. No.: 08/544,596

[22] Filed: Oct. 18, 1995

[30] Foreign Application Priority Data

Oct. 19, 1994 [JP] Japan .................................. 6-253385
Oct. 16, 1995 [JP] Japan .................................. 7-266868

[51] Int. Cl.$^6$ .................................................. H04N 5/335
[52] U.S. Cl. ........................................... 348/302; 348/296
[58] Field of Search ..................................... 348/294, 300, 348/301, 303, 308, 302, 306, 307, 309, 310; 257/229, 231; 250/208.1; H04N 5/335

[56] References Cited

U.S. PATENT DOCUMENTS

| 5,122,881 | 6/1992 | Nishizawa et al. . |
| 5,146,339 | 9/1992 | Shinohara et al. . |
| 5,335,008 | 8/1994 | Hamsaki .................................. 348/308 |
| 5,420,631 | 5/1995 | Hamasaki ................................. 348/229 |
| 5,539,196 | 7/1996 | Miyawaki ................................. 348/300 |
| 5,587,738 | 12/1996 | Shinohara ............................... 348/301 |

FOREIGN PATENT DOCUMENTS

| A2653881 | 5/1995 | European Pat. Off. . |
| A3653881 | 5/1995 | European Pat. Off. . |

*Primary Examiner*—Tuan V. Ho
*Attorney, Agent, or Firm*—Fitzpatrick, Cella, Harper & Scinto

[57] ABSTRACT

There is provided a photoelectric conversion apparatus capable of obtaining a high S/N ratio and subtracting an unnecessary component of the pixel output without using a memory. For this purpose, in a photoelectric conversion apparatus including plural photoelectric conversion pixels for converting light into an electrical signal and outputting the electrical signal onto signal output lines, the input of an amplifier is capacitively coupled to the signal output line of a photoelectric conversion pixel, and the output of the amplifier is connected to the signal output line through a switch. The amplifier is constituted by an emitter follower, a source follower, or an operational amplifier.

23 Claims, 19 Drawing Sheets

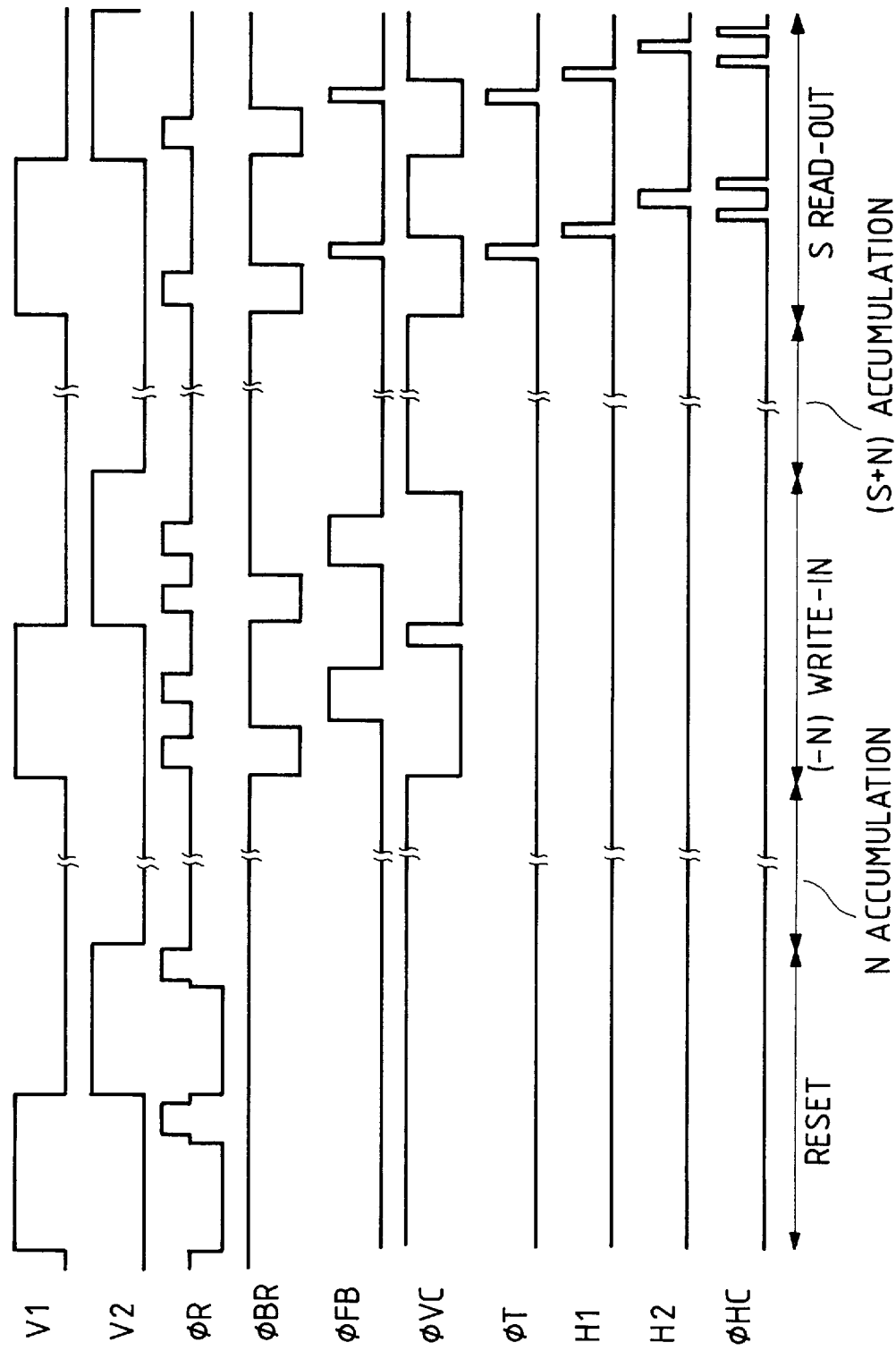

PHOTOELECTRIC CONVERSION APPARATUS AND METHOD WITH RESET

BACKGROUND OF THE INVENTION

1. Field of the Invention

The present invention relates to a photoelectric conversion apparatus formed on a semiconductor.

2. Related Background Art

Several types of conventional photoelectric conversion apparatuses whose photoelectric conversion pixels have output lines are available. These photoelectric conversion apparatuses are classified into MOS, SIT, FET, CMD, and bipolar photoelectric conversion apparatuses in accordance with different pixel arrangements.

FIG. 1 shows a two-dimensional bipolar photoelectric conversion apparatus in which each pixel is formed of a bipolar transistor to accumulate photocarriers in the base region.

Referring to FIG. 1, each photoelectric conversion pixel 1 is composed of an npn bipolar transistor 2, a p-type MOS transistor 3 connected to the base of the npn bipolar transistor 2 to reset the base, and a pixel capacitance 4 for controlling the potential of the base. A pixel accumulation signal output line 5 is connected to the emitter of the corresponding bipolar transistor 2. A MOS transistor 6 resets the corresponding output line 5. A transfer capacitance 7 holds and transfers an output voltage of the corresponding photoelectric conversion pixel 1. A MOS transistor 8 switches between the corresponding output line 5 and the corresponding accumulation capacitance 7. A signal from the transfer accumulation capacitance 7 is transferred to a horizontal output line 9. A MOS transistor 10 switches between the corresponding accumulation capacitance 7 and the horizontal output line in accordance with an output from a horizontal shift register 33. A preamplifier 11 amplifies a signal appearing on the horizontal output line 9. The preamplifier 11 has an output terminal 12.

A MOS transistor 13 resets the horizontal output line 9. A drive line 14 drives the corresponding pixels. A MOS transistor 16 switches between the corresponding drive line 14 and a drive pulse input line 15 which is a vertical line selected in accordance with an output from a vertical shift register 34. The photoelectric conversion apparatus has a power supply terminal 17 of a reference potential $V_{VC}$. An input terminal 18 applies a pulse $\phi VC$ to the gates of the MOS transistors 6. An input terminal 19 applies a pulse $\phi T$ to the gates of the MOS transistors 8. An input terminal 20 applies a pulse $\phi HC$ to the gate of the MOS transistor 13. An input terminal 21 receives a drive pulse $\phi R$.

Referring to FIG. 1, for descriptive convenience, an area sensor having 2×2 photoelectric conversion pixels is illustrated. Outputs from the vertical shift register are represented by V1 and V2, and outputs from the horizontal shift register are represented by H1 and H2. In practice, 256×256 or more pixels are often arranged in the photoelectric conversion apparatus.

FIG. 2 is a pulse timing chart for explaining the operation of the two-dimensional photoelectric conversion apparatus shown in FIG. 1. Each pulse in FIG. 2 is represented by high level or low level. However, the drive pulse $\phi R$ has the reference potential $V_{VC}$ as an intermediate level.

When the output V1 from the vertical shift register 34 goes high, and the drive pulse $\phi R$ from the input terminal 21 goes high, the first row of the two-dimensional photoelectric conversion pixels is driven. In the photoelectric conversion pixel 1, the p-type MOS transistor (to be referred to as a PMOS hereinafter) 3 is kept off, while the base potential of the bipolar transistor 2 rises through the pixel capacitance 4. An emitter current flows, and a signal voltage accumulated in the base of the pixel appears on the corresponding output line 5 in the floating state because the pulse $\phi VC$ is kept low. Both the outputs H1 and H2 from the horizontal shift register 33 are kept low, and the pulse $\phi T$ is kept high. In this state, an output signal on the floating signal output terminal 5 is accumulated in the accumulation capacitance 7. Subsequently, when the outputs H1 and H2 from the horizontal shift register 33 go high to output the carriers in the accumulation capacitance 7 from the output terminal 12 through the output line 9 and the preamplifier 11. Note that when the output H1 goes high to set the column of the output H1 in a drive state, and the accumulation capacitance 7 is discharged, the output H1 goes low, and the pulse $\phi HC$ goes high. The signal line 9 is reset. The column of the output H2 is then set in the drive state to sequentially read out the carrier signals from the signal line 9.

In the pixels of each row, when the vertical shift register output V1 is kept high, and the drive pulse $\phi R$ goes low, the PMOSs 3 are turned on to set the base potential of the bipolar transistors 2 to the reference potential $V_{VC}$. When the pulse $\phi VC$ goes high, and the MOS transistors 6 are turned on to set and fix the signal output lines 5 to the reference potential $V_{VC}$, the drive pulse $\phi R$ goes high. In this state, the PMOSs 3 are turned off, and the bipolar transistors 2 of the first row are turned off to cause the emitter and base currents to flow. The base potential of the bipolar transistors 2 gradually drops to about $V_{VC}+0.6$ V within several micro seconds, thereby resetting the pixel capacitances 4. In this case, when the drive pulse $\phi R$ returns to the intermediate level $V_{VC}$, the base potential is lowered through the pixel capacitances 4, and these transistors are reverse-biased with respect to the emitter potential $V_{VC}$. When the output V1 goes low, driving of this row is completed. The pixels of the first row start an accumulation operation for accumulating the optical carriers in the base regions until the first row is selected again.

When the output V2 goes high to select and drive the second row, the carrier signals are output. An operation for resetting the pixels is the same as in the first row.

In the bipolar photoelectric conversion apparatus described above, a signal voltage accumulated in the pixel capacitance almost defined by each pixel capacitance 4 directly appears on the corresponding accumulation capacitance 7. When the accumulation capacitance 7 is much larger than the pixel capacitance 4, the signal charge is amplified by a ratio of the two capacitance. Therefore, the influences of noise from the signal output path, the output line 5, the accumulation capacitance 7, the output line 9, and the preamplifier 11 can be reduced.

In the conventional example, however, when the signal is transferred from the accumulation capacitance 7 to the horizontal output line 9 in FIG. 1, the signal is capacitively divided by the stray capacitance of the horizontal output line 9, thereby lowering the signal potential. Even in a dark state, a dark output varies depending on the variations in characteristics of each pixel, and the S/N ratio is undesirably lowered. In particular, when the bipolar transistor is used for the light-receiving pixel as in the conventional example shown in FIG. 1, the accumulation capacitance 7 often has a large value. When the emitter flows to charge the accumulation capacitance 7 in reading out the signal from the pixel, the signal charge in the pixel base is destroyed. An increase in destruction amount causes an increase in noise, thereby greatly reducing the S/N ratio.

In addition, a general conventional photoelectric conversion pixel has a simple photoelectric conversion function of reset→accumulation→read-out. Signal processing for the pixel output must be performed in an area except for the photoelectric conversion pixel. This photoelectric conversion pixel has a limitation which requires a field memory to process signals.

An example of a solid-state image pickup device of another type is shown in FIGS. 8 to 11. FIG. 8 is a diagram showing the overall circuit arrangement. Referring to FIG. 8, pixels 121-11 to 121-mn are formed on a single substrate in the matrix form. Each pixel comprises an n-channel normally on (depletion) SIT (Static Induction Transistor) 122 serving as an image pickup element, a gate capacitor 124 connected to a floating gate 123 of the SIT 122, a p-channel enhancement control transistor 125 having a source-drain path connected to the floating gate 123 (each pixel is represented by a broken line).

A video voltage $V_D$ is applied to the drain (substrate) of the SIT constituting each pixel. Row lines 126-1, ..., 126-m are connected to the gate capacitors of the SITS of the pixels 121-11 to 121-1n, ..., 121-m1 to 121-mn of the rows arranged in the X direction, and row selection signals $\phi_{G1}, \ldots, \phi_{Gm}$ are applied from a vertical scanning circuit (vertica shift register) 127 to the row lines 126-1, ..., 126-m, respectively. Column lines 128-1, ..., 128-n are connected to the sources of the SITs of pixels 121-11 to 121-m1, ..., 121-1n to 121-mn of the columns arranged in the Y direction, respectively. These column lines are grounded through column selection transistors 129-1, ..., 129-n, a common video line 130, and a load resistor 131, and column selection signals $\phi_{S1}, \ldots, \phi_{Sn}$ are applied from a horizontal scanning circuit (horizontal shift register) 132 to the gates of the column selection transistors 129-1, ..., 129-n, respectively.

A control gate line 133 and an overflow drain line 134 are respectively connected to the gate and drain of the control transistor 125 constituting each pixel, and a control gate signal $\phi_c$ and a control drain voltage $V_c$ are applied to the control gate line 133 and the overflow drain line 134, respectively.

FIG. 9 is a plan view showing the arrangement constituted by four adjacent pixels. FIG. 10 is a sectional view of this arrangement along the line 10—10 of FIG. 9. In this arrangement, to increase the area efficiency of the pixels formed on a substrate 140, four adjacent pixels are formed symmetrically in the vertical and horizontal directions. The substrate 140 constitutes the drain of each SIT and consists of an n⁺- or n-type semiconductor. An n⁻-type epitaxial layer 141 is grown on the substrate 140, and a separation region 142 consisting of a buried insulator or the like is formed in the epitaxial layer 141 to electrically and optically separate the adjacent pixels from each other. In each pixel, the gate and source of the SIT are constituted by a p⁺-type diffusion layer 143 and an n³⁰ -type diffusion layer 144 formed on the surface of the epitaxial layer 141, respectively. The n⁺-type diffusion layer 144 is connected to the corresponding column lines 128-i and 128-(i+1) through a wiring layer 145 consisting of, e.g., polysilicon. Row line electrodes 146-i and 146-(i+1) consisting of, e.g., polysilicon and forming the row lines 126-i and 126-(i+1) through a gate oxide film are formed on the p⁺-type diffusion layer 143, so that the row line electrode forms a gate capacitor at a portion opposing the p⁺-type diffusion layer 143.

The p⁺-type diffusion layer 143 of the respective pixels is formed to extend to the central portion of the four adjacent pixels. The central portion serves as the source of the control transistor 125 of each pixel. At the same time, a p⁺-type diffusion layer 147 constituting the drains of the control transistors of the four pixels is formed on the epitaxial layer 141 at the central portion of the four pixels so as to be spaced apart from the p⁺-type diffusion layer 143 constituting the gate of the SIT and the source of the control transistor of each pixel. The p⁺-type diffusion layer 147 is connected to the overflow drain line 134 through a wiring electrode 148. A control gate electrode 149 of the control transistors of the four pixels which forms the control gate line 133 through the gate oxide film is commonly formed on the surface of the epitaxial layer 141 between the p⁺-type diffusion layers 147 and 143.

An operation of the above arrangement will be described with reference to the timing chart shown in FIG. 11. In this arrangement, as described above, the row lines 126-1 to 126-m are sequentially selected. After each row line is selected, the column lines 128-1 to 128-n are sequentially selected. In accordance with this X-Y addressing scheme, pixel signals are sequentially read out. When a signal read-out period $t_H$ for each row line is completed, all the pixels of the selected row line are simultaneously reset during a horizontal blanking period $t_{BL}$ for selecting the next row line. In particular, the pixel 121-22 is taken as an example, and its operation will be described with reference to a change in its floating gate potential $V_G(2,2)$ in FIG. 11. In the potential $V_G(2,2)$ of the floating gate 123 of the pixel 121-22 in FIG. 11, a solid line represents a potential upon incidence of light during an image pickup operation, while a broken line represents a potential without incidence of light during the image pickup operation.

At a timing $t_1$, when the row selection signal $\phi_{G2}$ applied to the row line 126-2 has a voltage $V\phi_G$, the potential of the floating gate of each SIT connected to this row line is increased by almost $V\phi_G$. More specifically, the potential is increased by $$\{C_G/(C_J+C_G)\} \cdot V\phi_G$$

where $C_G$ is the capacitance of the gate capacitor 124, and $C_J$ is the parasitic diffusion capacitance of the p⁺-type diffusion layer 143.

At a timing $t_2$, when the column selection signal $\phi_{S2}$ goes high, and the column line 128-2, i.e., the pixel 121-22 is selected, a signal current depending on the potential $V_G(2,2)$ of the floating gate 123 of the pixel 121-22 flows through the load resistor 131 through the column line 128-2, the column selection transistor 129-2, and the video line 130 and is read out as an output signal $V_{OUT}$ upon the voltage drop across the load resistor 131. In this signal read-out, the optical charge accumulated in the floating gate 123 is generally held, and this read-out is nondestructive read-out.

The selection of the last line 128-n is completed. At a timing $t_3$ when the signal read-out of all the pixels 121-21 to 121-2n connected to the row line 126-2 is completed, i.e., at the start of the horizontal blanking period $t_{LB}$, the voltage of the control gate signal $\phi_C$ applied to the control gate line 133 is set to $-V\phi_C$ for turning on the control transistor 125. At this time, the surface potential $\phi_S(0)$ under the control gate electrode 149 changes to $\phi_S(-V\phi_C)$, and the gate potential $V_G(2,2)$ is forcibly clamped to the potential $\phi_S(-V\phi_C)$, thereby resetting the gate potential. In the subsequent light irradiation, the optical charge $Q_P$ accumulated in the gate is swept. The voltage $-V\phi_C$ of the control gate signal $\phi_C$ is set such that the surface potential $\phi_S(-V\phi_C)$ under the control gate electrode 149 upon application of the control gate signal $\phi_C$ is almost equal to a pinch-off voltage $V_{GO}$ of the SIT, and condition $\phi_S(-V\phi_C) > V_C$ is established for the control drain voltage $V_C$.

At a timing $t_4$, i.e., at the end of the horizontal blanking period $t_{BL}$, the row selection signal $\phi_{G2}$ goes low, and the control gate signal $\phi_C$ is set zero. With this operation, the gate potential $V_G(2,2)$ is decreased to $V_G(2,2) = \phi_S(-V\phi_C) - V\phi_G$. The optical charge is integrated depending on the incident light amount during the image pickup period until the next read-out. For example, the gate potential is increased by, e.g., $Q_P/C_G(=\Delta V_{GP})$.

In this arrangement, the control gate signal $\phi_C$ is applied not only to the electrodes of the control gate lines 133 of the pixels connected to the selected row line, but also to the electrodes of all the pixel control gate lines 133 which are set in a nonselected state. When the gate signal $\phi_C$ has the voltage $-V\phi_C$, the surface potential under the electrode of the control gate line 133 of each nonselected pixel becomes almost equal to $\phi_S(-V\phi_C)$, i.e., the pinch-off voltage $V_{GO}$ as in the selected pixels. For this reason, even if the optical charge accumulation amounts in some nonselected pixels are equal to each other, and an increase $\Delta V_{GP}$ of the gate electrodes becomes $$\phi_S(-V\phi_C) - V\phi_G \Delta V_{GP} > \phi_S(-V\phi_C)$$

that is, $\Delta V_{GP} > V\phi_G$, the optical charge corresponding to the potential $\phi_S(-\phi V_C)$ i.e., the gate potential which exceeds the pinch-off voltage $V_{GO}$ of the SIT is swept to the overflow drain line 134 through the channel below the control gate electrode. In addition, the overflow operation of the excessive charge is performed for all the nonselected pixels every time the row line is changed. Even if strong incident light is present, the potential of the floating gate does not exceed the pinch-off voltage $V_{GO}$. For this reason, a semi-selected signal phenomenon can be effectively prevented, and this can be equivalently observed in blooming control.

Each pixel is reset by causing the control gate signal $\phi_C$ to clamp the potential of the floating gate of the SIT to $\phi_S(-V\phi_C)$. The residual optical charge in the resetting operation can be perfectly zero. Therefore, in forward-biasing and resetting a p-n junction between the gate and source of the SIT, various after image phenomena can be perfectly controlled in this arrangement.

The conventional example described above poses a problem of large fixed pattern noise (to be referred to as FPN hereinafter) as one of the drawbacks of an amplification solid-state image pickup element. In an application of this element to a light amount detector, a target object must be distinguished from external light and detected with high precision. A so-called external light removal function is required.

A conventional example shown in FIG. 12 is available to solve the above problem. The arrangement and operation of the lower half of FIG. 12 are identical to those in FIGS. 8 to 11. In the upper half of FIG. 12, a drive signal is supplied from a vertical scanning circuit 152 to horizontal drive lines 150-1 and 150-2 to activate the optical signals from memory cells 153-11 to 153-22 for each horizontal drive line. Each pixel signal read out onto the vertical output line is output to the horizontal output line for each pixel upon reception of timing pulses $\phi_{S1}$ and $\phi_{S2}$ from a horizontal scanning circuit 132. At this time, the read-out of each pixel and the read-out of each pixel of the lower half of FIG. 12 are simultaneously performed. Signals are simultaneously read out from the pixels 121-22 of the lower half and the pixel 153-22 of the upper half onto a vertical output line 128-2. When incident light components having the same light amount are supplied to the pixels, a double optical carrier component appears at an output $V_{out}$. In this case, two identical image sensors, two optical systems for focusing outputs from the image sensors onto a chip, and two vertical scanning circuits are required. However, the optical sensitivity can be improved, and the FPN can be reduced.

In this conventional example, although the above problem can be solved and the FPN can be reduced, memory elements having the same number as that of pixels are required. For this reason, for an image pickup element for a high resolution, a chip size undesirably becomes very large.

SUMMARY OF THE INVENTION

It is, therefore, the first object of the present invention to provide a photoelectric conversion apparatus capable of obtaining an output at a high S/N ratio.

It is the second object of the present invention to provide a photoelectric conversion apparatus capable of subtracting an unnecessary component of a pixel output without using a memory.

In order to achieve the first object of the present invention, there is provided a photoelectric conversion apparatus wherein an output line of a pixel is capacitively coupled to an input section of an emitter follower amplifier, and an output section of the emitter follower is connected to the pixel output line through switching means. In this arrangement, a change in output potential of the emitter follower can be positively fed back to the input section of the emitter follower itself, thereby amplifying the pixel output.

In order to achieve the second object of the present invention, there is provided a photoelectric conversion apparatus wherein after the feedback operation for the emitter follower of the amplifier of the first object, a pixel is reset for the output potential. More specifically, there is provided a photoelectric conversion apparatus including a photoelectric conversion pixel for accumulating carriers generated by an optical signal in a base of a control electrode of a transistor and outputting an output corresponding to the optical signal from an emitter of a main electrode of the transistor, comprising emitter or source follower amplifier means connected to an output line of each pixel of the photoelectric conversion pixel, connection means for connecting an output from the amplifier means to the output line of the pixel, and means for resetting a control electrode of a transistor pixel with respect to the output from the amplifier means. With this operation, external component removal as in photometry can be realized without using a memory.

According to the present invention, there is also provided a solid-state image pickup apparatus comprising a plurality of photoelectric conversion elements, processing means connected to output terminals of the plurality of photoelectric conversion elements, switching means for connecting an output from the processing means to the output terminals of the photoelectric conversion elements, and means for resetting the photoelectric conversion elements with an output voltage from the processing means.

In the above solid-state image pickup apparatus, the photoelectric conversion element accumulates carriers upon reception of an optical energy on the control electrode of the transistor and outputs a signal based on the carriers accumulated from the main electrode region.

In the above solid-state image pickup apparatus, the switching means is a MOS transistor.

According to the present invention, there is further provided a solid-state image pickup apparatus comprising a plurality of photoelectric conversion elements, a clamp capacitance and switching means which are connected to a column output line of each of the photoelectric conversion elements, resetting means for resetting the photoelectric conversion elements for connecting an output terminal of the clamp capacitance to an output terminal of the switching means, and transfer means for transferring an output from the switching means to an output line.

In the above solid-state image pickup apparatus, the transfer means comprises an accumulation capacitance for accumulating a charge from the photoelectric conversion element through the switching means, and transfer switching means for time-serially transferring the charge of the accumulation capacitance onto the output line in accordance with a timing signal from a horizontal scanning circuit. In the above solid-state image pickup apparatus, the photoelectric conversion element is a bipolar or static induction photoelectric conversion element.

The above and other objects, features, and advantages of the present invention will be apparent from the following detailed description of the preferred embodiments in conjunction with the accompanying drawings.

BRIEF DESCRIPTION OF THE DRAWINGS

FIG. 5 is a timing chart for explaining the operation according to the second embodiment of the present invention;

DETAILED DESCRIPTION OF THE PREFERRED EMBODIMENTS

Figure 1:
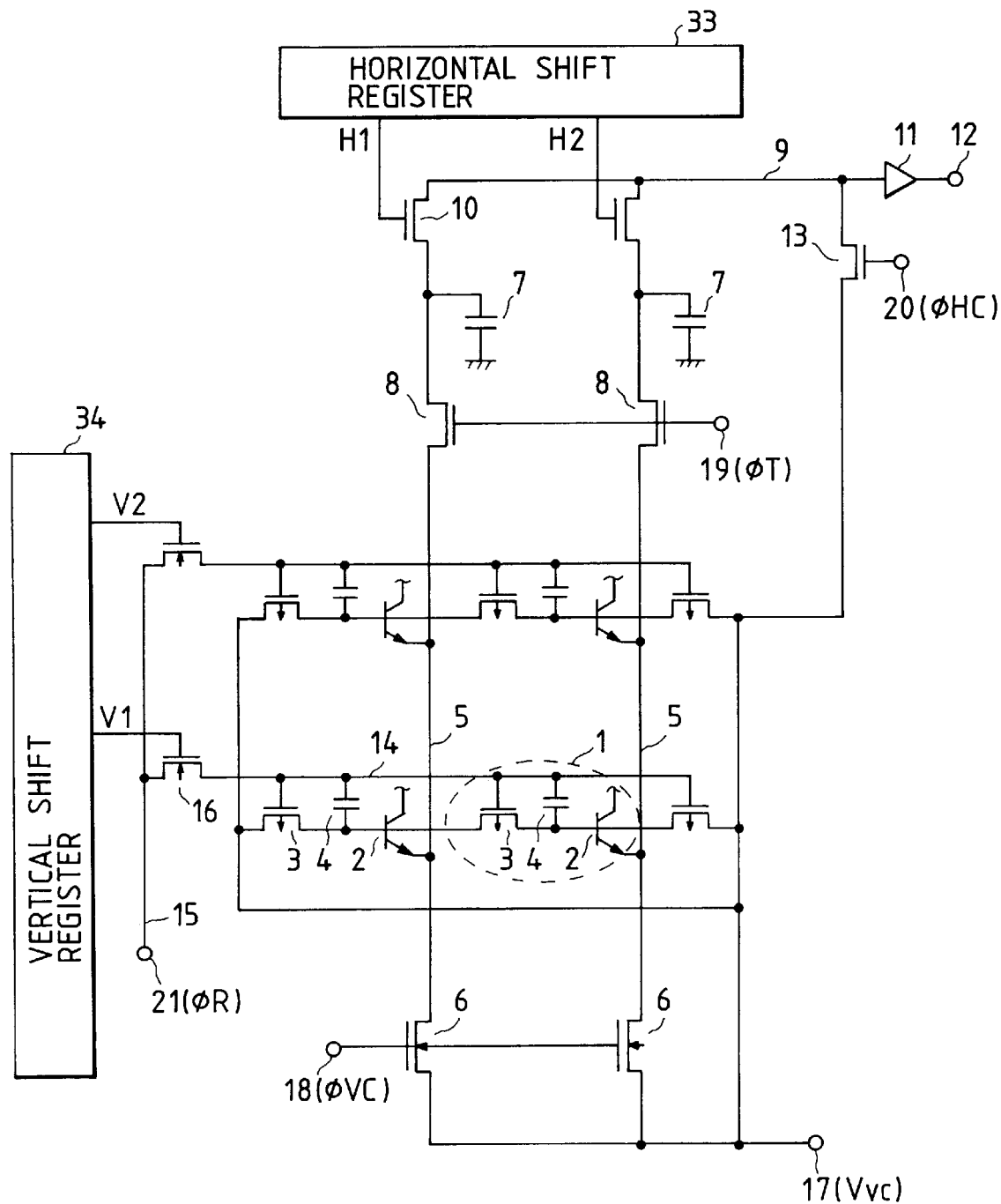
FIG. 1 is an equivalent circuit diagram of a conventional photoelectric conversion apparatus.
Figure 2:
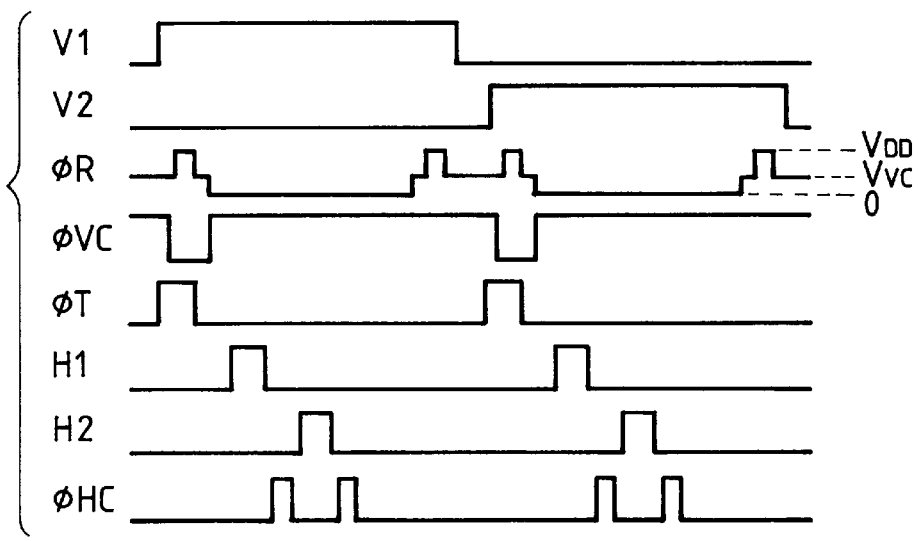
FIG. 2 is a timing chart for explaining the operation of the conventional photoelectric conversion apparatus.
Figure 3:
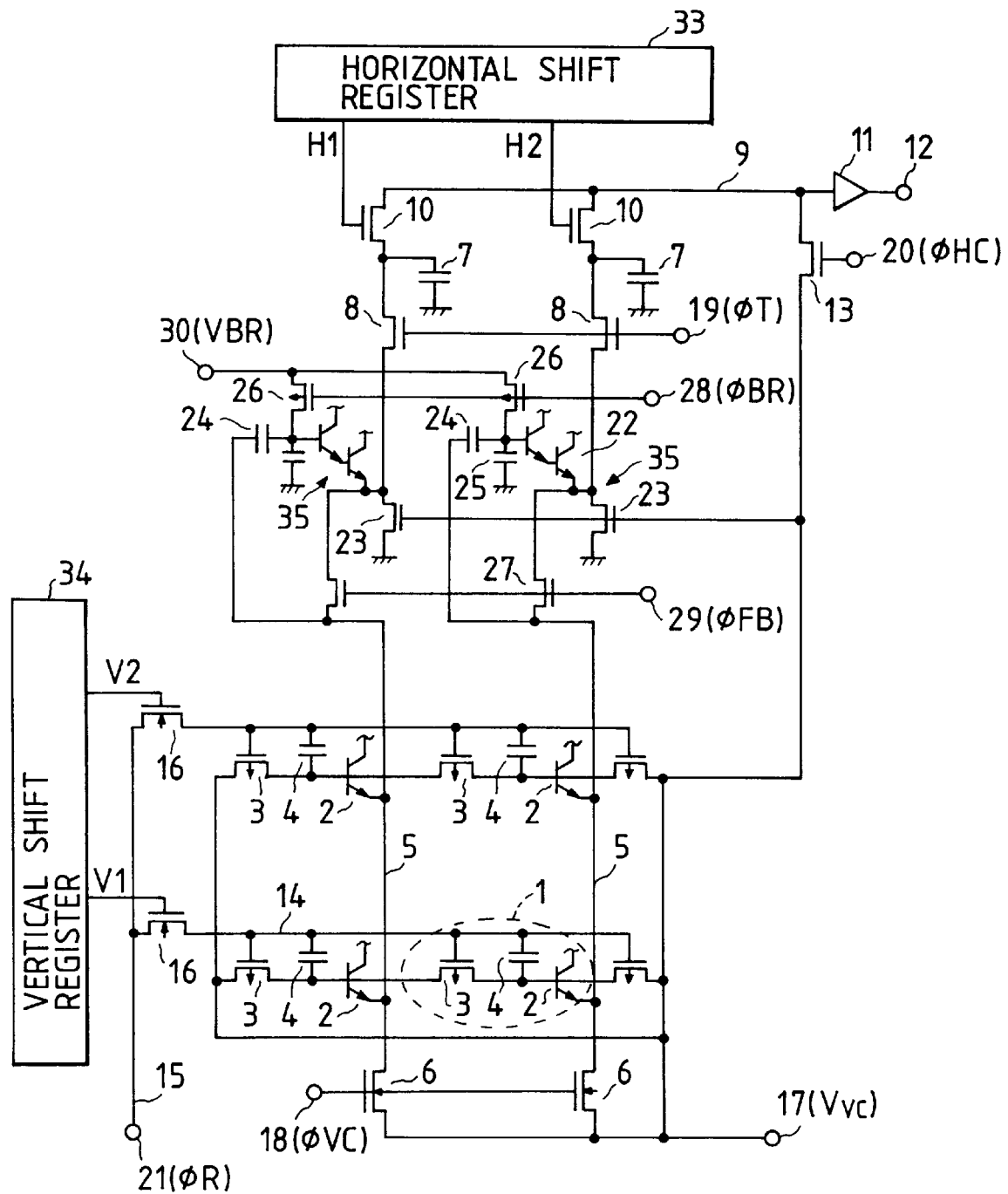
FIG. 3 is an equivalent circuit diagram of a photoelectric conversion apparatus according to the present invention.

FIG. 3 is an equivalent circuit diagram of a two-dimensional photoelectric conversion apparatus exemplifying 2×2 pixels best illustrating the characteristic feature of the present invention. The same reference numerals as in FIG. 1 denote the same elements and functions in FIG. 3, and a detailed description thereof will be omitted.

Referring to FIG. 3, the two-dimensional photoelectric conversion apparatus includes a Darlington bipolar transistor 22 for an amplifier and a constant current source MOS transistor 23. The Darlington bipolar transistor 22 and the MOS transistor 23 constitute each emitter follower 35. The gate of the MOS transistor 23 in FIG. 3 has a reference intermediate potential $V_{VC}$. A coupling capacitance 24 capacitively couples the input base section of the emitter follower 35 and an output line 5. The Darlington bipolar transistor 22 has a base capacitance 25. A p-type MOS transistor 26 controls the base potential of the Darlington bipolar transistor 22. A MOS transistor 27 serves as a switch to switch between the corresponding output section of the emitter follower and the corresponding output section 5. A terminal 28 applies a gates pulse ϕBR to the gate of the MOS transistors 26. A terminal 29 applies a negative feedback pulse ϕFB to the gates of the MOS transistors 27. A power supply terminal 30 supplies a potential $V_{BR}$.

Figure 4:
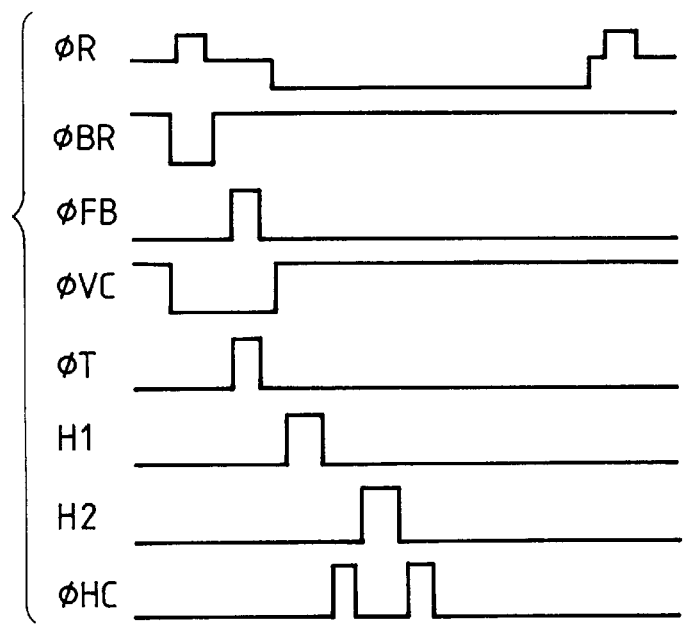
FIG. 4 is a timing chart for explaining the operation according to the first embodiment of the present invention.

FIG. 4 is a pulse timing chart for explaining the operation of the two-dimensional photoelectric conversion apparatus according to the first embodiment shown in FIG. 3. The elements of each row accumulate optical carriers and are sequentially selected in the same manner as in FIG. 1. FIG. 4 is a timing chart of driving one row.

When the drive pulse ϕR goes high from the intermediate level $V_{VC}$, and an output V1 from a vertical shift register 34 is set high, outputs from the pixels of the selected row are read out onto the output lines 5 in the floating state. At this time, as the pulse ϕBR at the terminal 28 is set low, the PMOS transistors 26 are turned on, the bases of the bipolar transistors 22 are set at $V_{VR}$, and outputs from the emitter followers 35 each constituted by the Darlington bipolar transistor 22 and the MOS transistor 23 are set at about a voltage value ($V_{BR}$−1.2 V). For the descriptive convenience, the output from the emitter follower 35 is given as the reference potential $V_{VC}$. Assume that when the drive pulse ϕR returns to the intermediate level, and the pixel read-out is completed, a voltage at the output terminal 5 is given as $V_{VC}+V_1$, that the pulse ϕBR then goes high to set the base of each bipolar transistor 22 in a floating state, and that the pulse ϕFB at the terminal 29 goes high to electrically connect the output section of each emitter follower 35 to the corresponding output line 5. The potential of the output line 5 changes from $V_{VC}+V_1$ to $V_{VC}+V_2$. The value of the voltage $V_2$ is defined as follows.

When the values of the coupling capacitance 24 and the parasitic capacitance 25 are defined as C0 and C1, the voltage changes from $V_{VC}$ by $[C0/(C0+C1)]\cdot(V_2-V_1)$ because the output value of the emitter follower 35 receives the potential change of the output line 5 through coupling of the coupling capacitance 24. Since the changed value is $V_{VC}+V_2$, so that $$V_{VC}+[C0/(C0+C1)]\cdot(V_2-V_1)=V_{VC}+V_2$$

therefore $$V_2=-(C0/C1)\cdot V_1$$

With the above operation, the emitter follower 35 outputs a signal obtained by multiplying the voltage $V_1$ by the gain $-(C0/C1)$ because the voltage $V_1$ is a pixel output potential. This output from the emitter follower 35 is accumulated in an accumulation capacitance 7 through a transistor 8 during high level of the pulse φT at a terminal 19. While the output H1 from a horizontal shift register 33 is kept high, a MOS transistor 10 is turned on to sequentially transfer the accumulated charges to an amplifier 11.

When the parasitic capacitance of a horizontal output line 9 and the value of the accumulation capacitance 7 are defined as CH and CT, respectively, a capacitance division at a ratio CT/(CH+CT) is imposed in data transfer to the preamplifier 11 as in the conventional case. However, for example, if the C0/C1 value is set to (CH+CT)/CT, a decrease in signal which is caused by the capacitive division can be compensated. The capacitance CT of the accumulation capacitance 7 is normally set to several pico farads, but C0 can be set to about several hundreds of femt farads. For this reason, for each pixel, a charge amount flowing in the read-out can be smaller than that in the conventional case. The destruction degree of the pixel signal can be reduced, so that the S/N ratio at the pixel output timing can be increased.

FIG. 5 is a drive timing chart for explaining the second embodiment of the present invention using the two-dimensional photoelectric conversion apparatus shown in FIG. 3. In the second embodiment, as shown in FIG. 5, resetting, external light noise accumulation, accumulation of external light noise N in a pixel, accumulation of both LED light and external light noise in a pixel, and read-out of pixel carrier signal are sequentially, time-serially performed.

When the two-dimensional photoelectric conversion apparatus is used as a photometric image sensor, both a specific necessary optical signal and an unnecessary signal such as external light may exist. For example, the light amount or spectrum of LED light is measured under the condition that external light is incident.

To remove an external light component in a conventional case, only a light component is received and read out, and the read-out output from each pixel is written in a prepared memory. Light in which external light is mixed with LED light is received and read out, and a difference between the resultant light component and the external light component already written in the memory is calculated.

The second embodiment according to the present invention is a method of removing an external light component without using a memory and will be described with reference to FIG. 5.

Referring to FIG. 5, when a drive pulse φR is set at low level, the base potential of each pixel transistor 2 of the first row selected by an output V1 from a vertical shift register 34 is set at $V_{VC}$ as in the conventional case. The base potential is reset when the drive pulse φR is set high. This operation is repeated for the second and subsequent rows.

Only external light is accumulated in the base of each pixel transistor 2. The next operation is the characteristic feature of the second embodiment of the present invention. That is, in selection of the first row, in the same manner as in the read-out operation of the first embodiment described with reference to FIG. 4, an external light component output potential is set at $V_N$, a pulse φBR is temporarily set at low level, and then a pulse φFB is temporarily set at high level, thereby outputting, to a corresponding output line 5, an output of an emitter follower 35 which is obtained by multiplying the external light base accumulation potential with $-C0/C1$. Note that condition C0=C1 is almost established in the second embodiment. The potential of the output line 5 is set at $(V_{VC}-V_N)$. This output is a low-impedance output obtained by the emitter follower 35. When the corresponding pixel is reset with respect to this potential after the drive pulse φR is set high, the pixel base potential is determined by a potential defined by $-V_N$.

Accumulation of light containing LED light to be measured is started. The pixel base potential is increased by the sum of a voltage component $V_N$ corresponding to the external light and a voltage component $V_L$ corresponding to the LED light. Since the voltage component $V_N$ cancels the pixel potential $-V_N$ obtained prior to the accumulation. In the next read-out operation, an output from the pixel becomes the voltage component $V_L$ corresponding to the LED light, and no external light component $V_N$ is contained. The read-out and transfer operations of the voltage component $V_L$ corresponding to this LED light are performed in the same manner as in the first embodiment.

In the operation of the second embodiment, since both the external component $V_N$ and the variation component of each pixel output can be removed, a signal having a high S/N ratio can be obtained.

Figure 6:
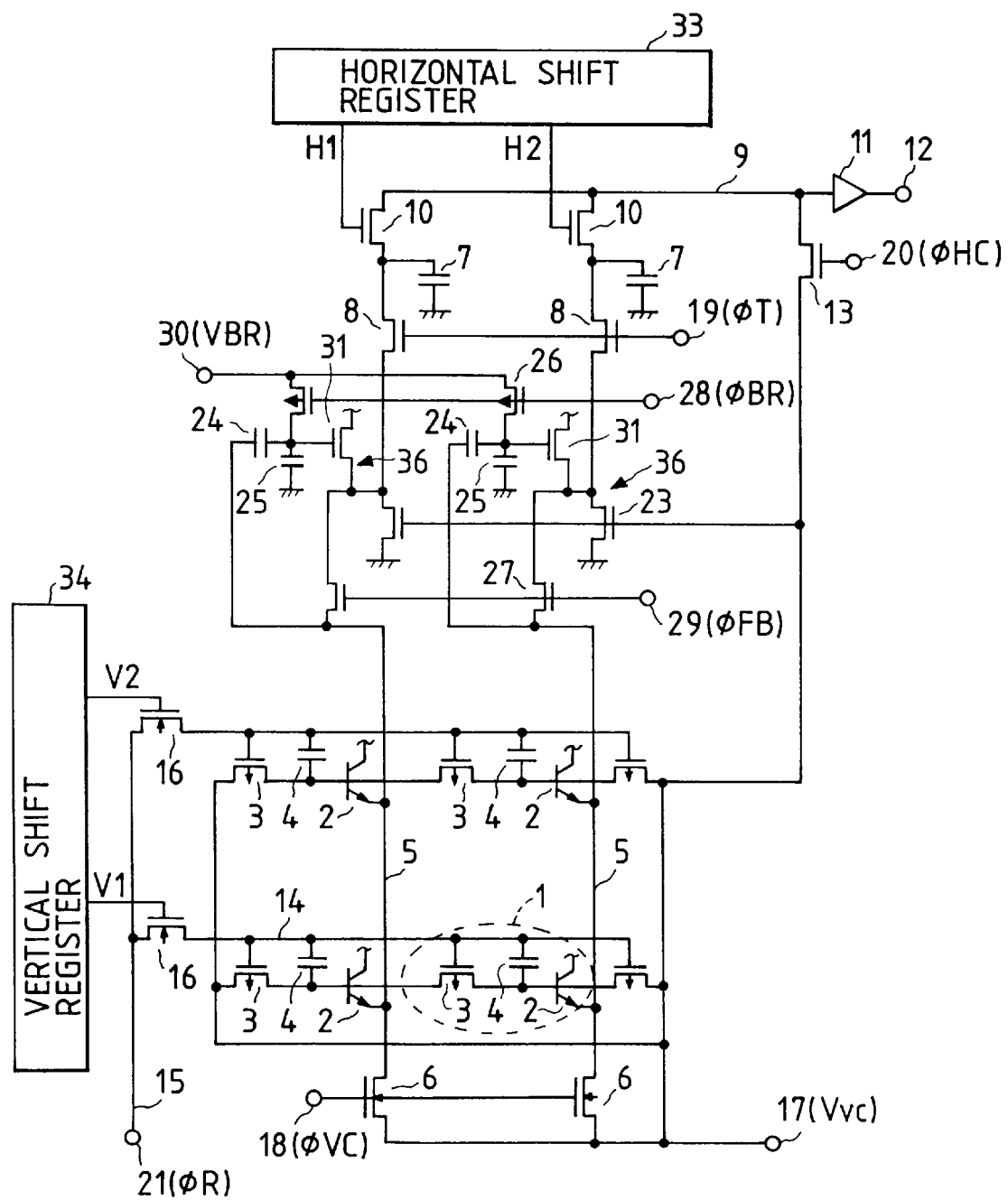
FIG. 6 is an equivalent circuit diagram of a photoelectric conversion apparatus according to the third embodiment of the present invention.

The third embodiment will be described below. FIG. 6 is an equivalent circuit diagram showing the arrangement of the third embodiment of the present invention. The same reference numerals as in FIG. 3 denote the same parts in FIG. 6, and a detailed description thereof will be omitted.

Referring to FIG. 6, each source follower 36 comprises a MOS transistor or junction transistor 31 and a constant current source constituted by a transistor 23. In the third embodiment shown in FIG. 6, the Darlington emitter follower 35 in FIG. 3 is replaced with the source follower 36, and the drive operation is the same as that of the first and second embodiment. In the third embodiment, as opposed to the Darlington emitter follower 36, an input impedance is high, and the temperature drift of each transistor element is small. In addition, the number of manufacturing steps can be reduced in IC formation. However, the third embodiment is suitable for the operation of the second embodiment rather than the operation of the first embodiment because a capacitance ratio of a coupling capacitance 24 of a signal line 5 and a parasitic capacitance 25 having a large variation must be kept constant.

Figure 7:
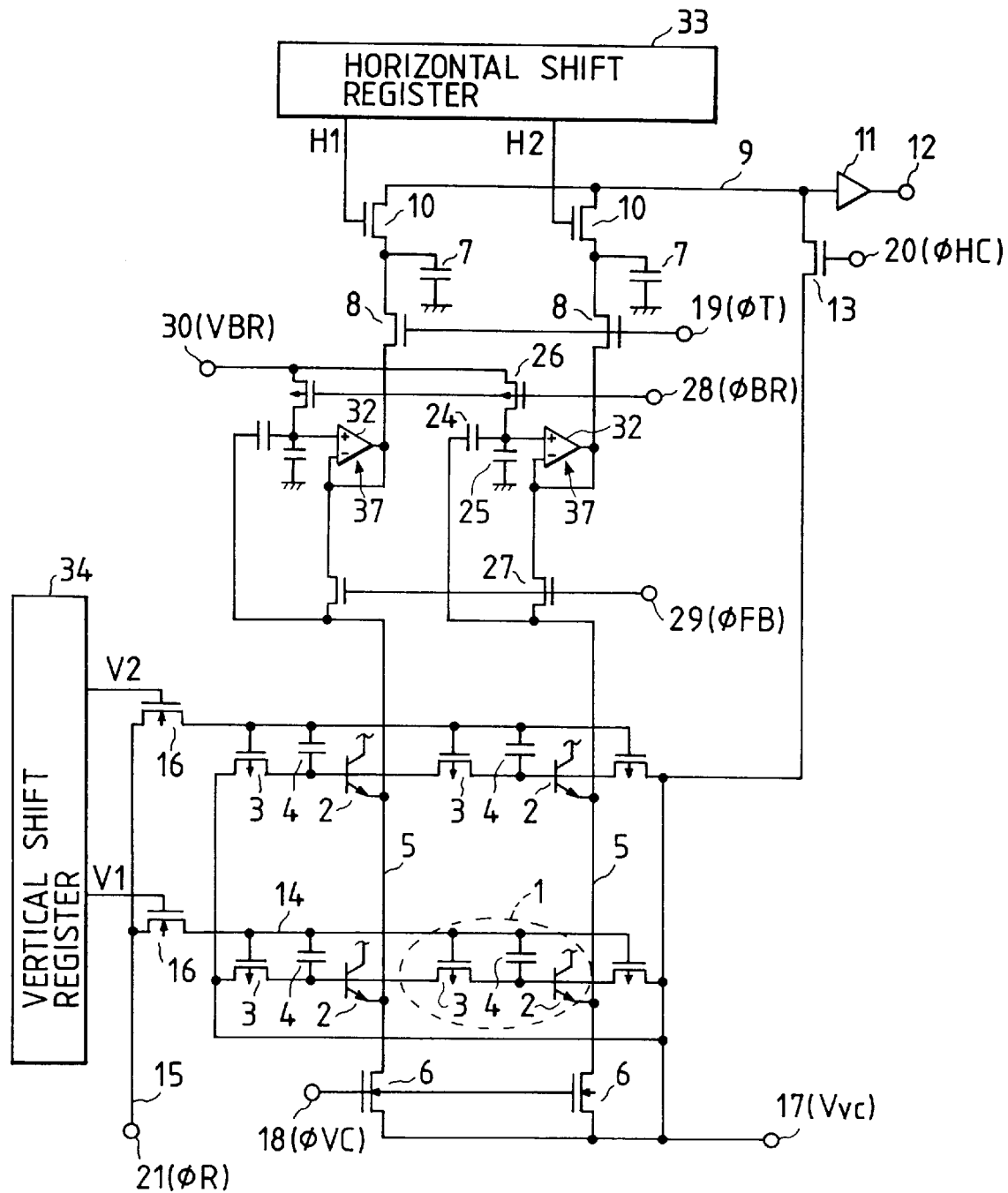
FIG. 7 is an equivalent circuit diagram showing a photoelectric conversion apparatus according to the fourth embodiment of the present invention.
Figure 8:
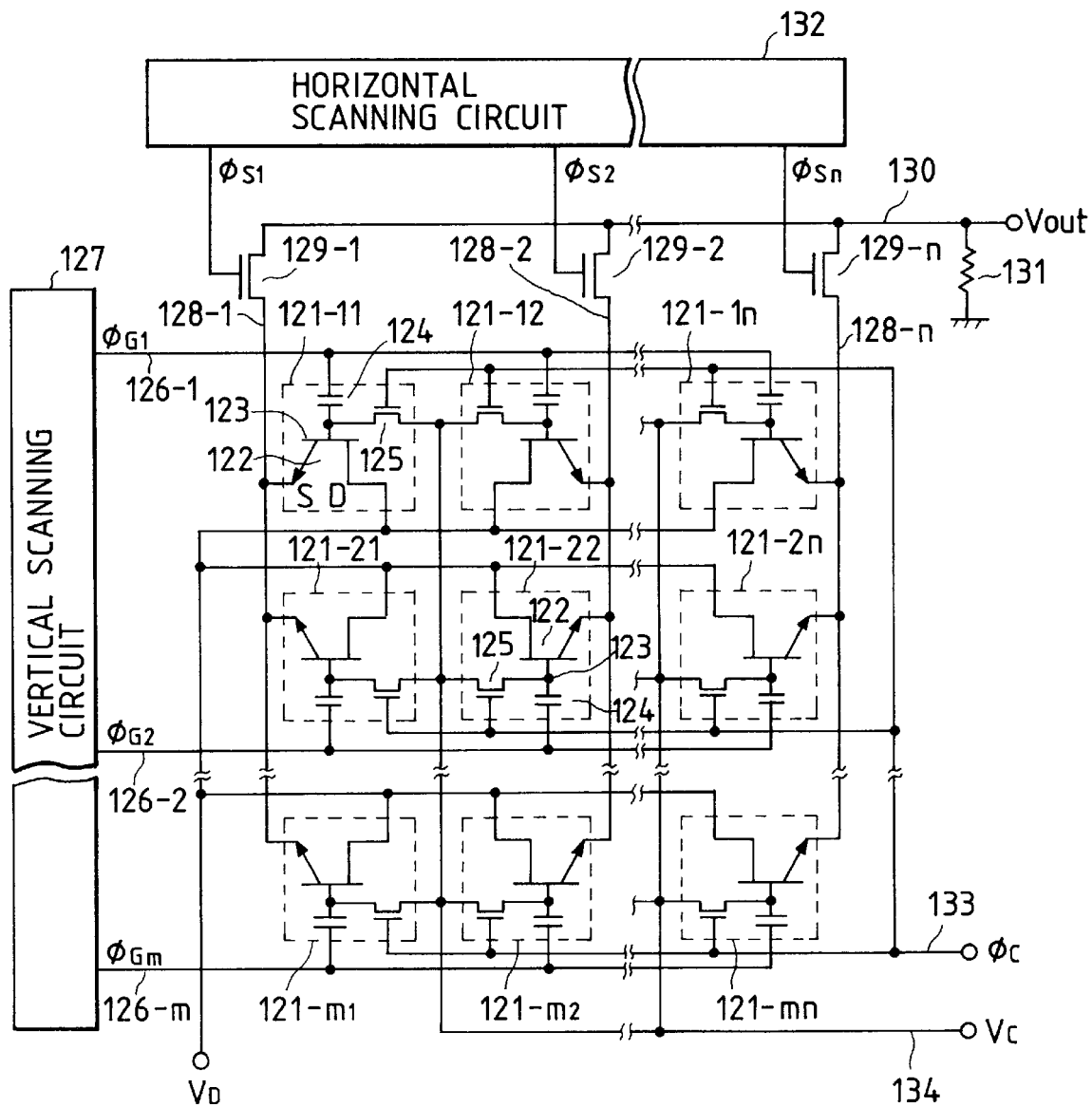
FIG. 8 is a schematic equivalent circuit diagram of a conventional solid-state image pickup apparatus.
Figure 9:
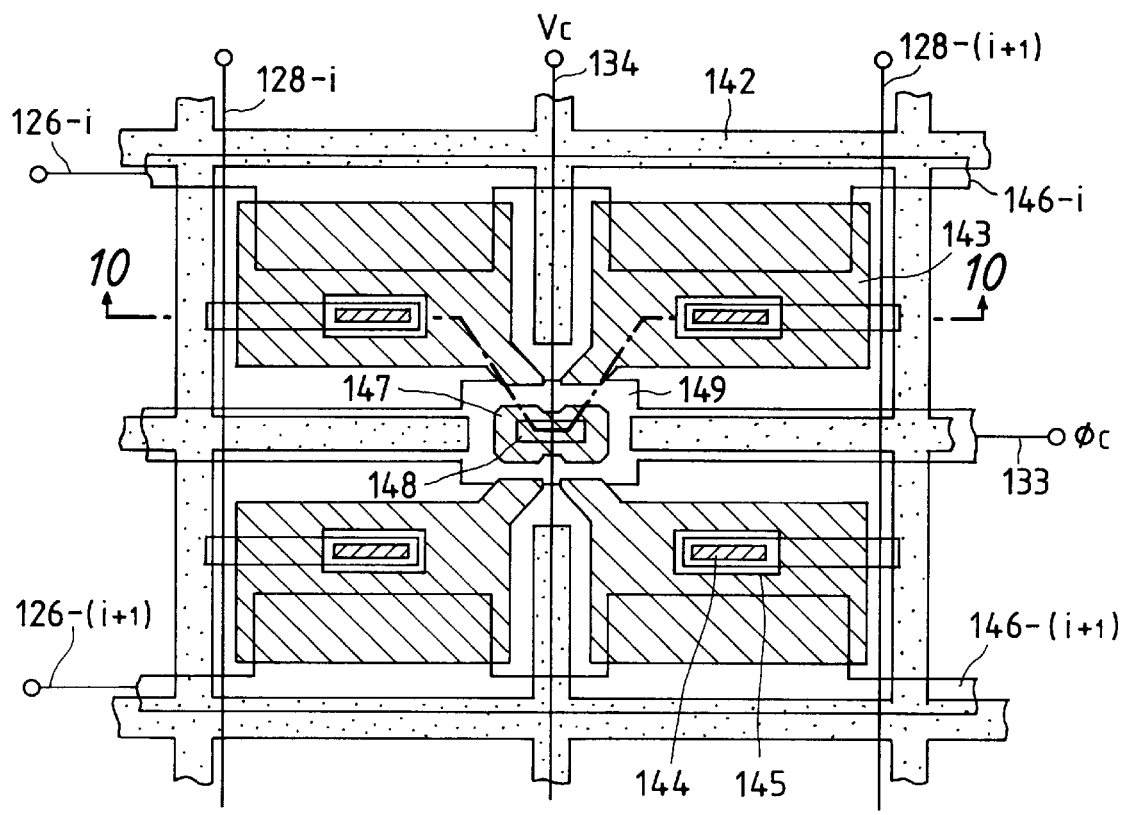
FIG. 9 is a plan view showing a portion around the pixels in the conventional solid-state image pickup apparatus in FIG. 8.
Figure 10:
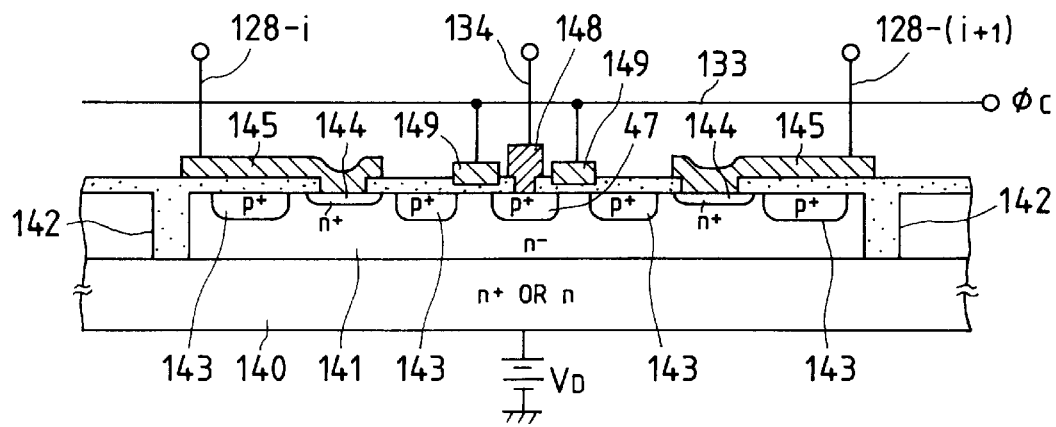
FIG. 10 is a schematic sectional view of the solid-state image pickup apparatus in FIG. 8.
Figure 11:
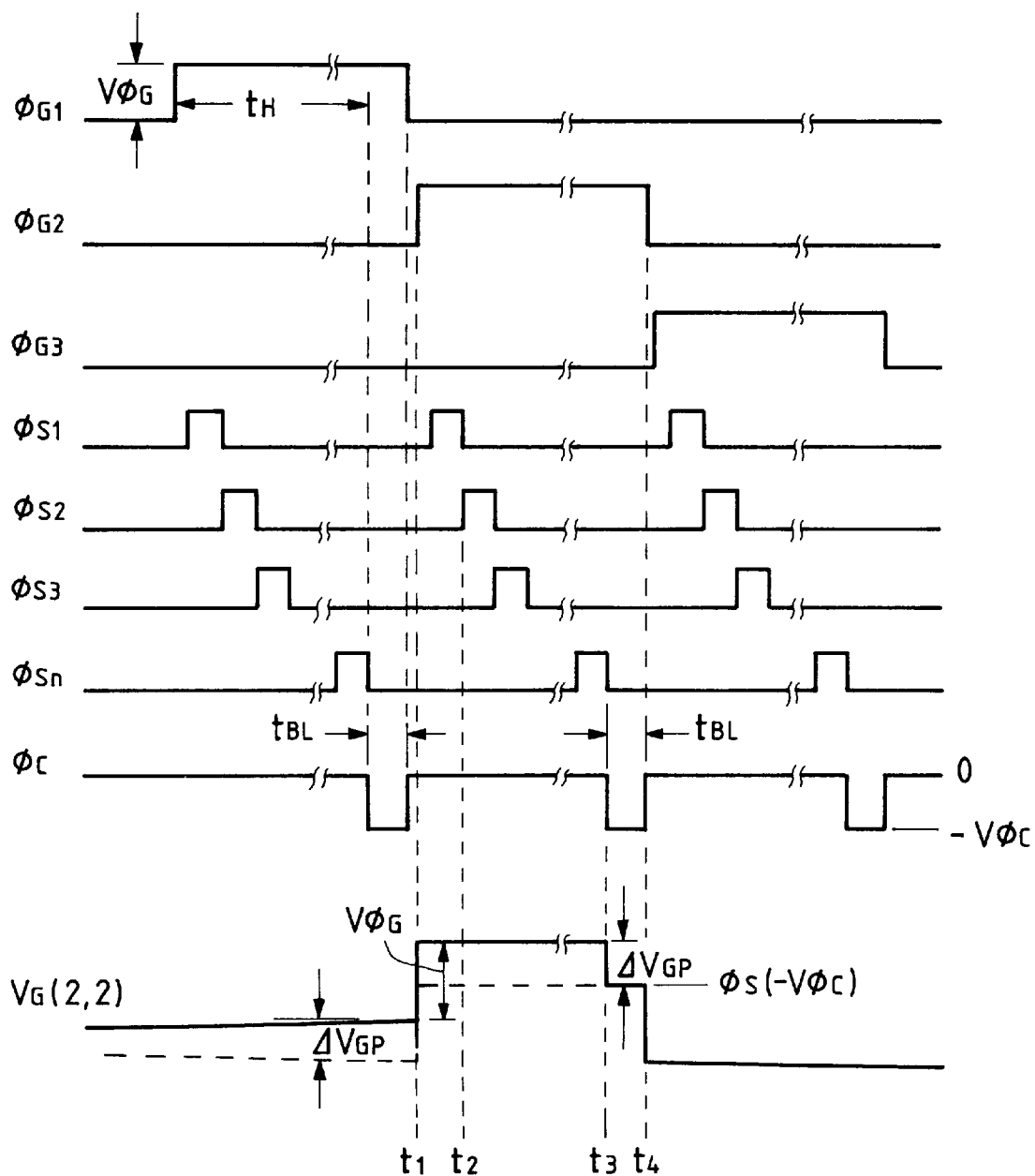
FIG. 11 is a timing chart for explaining the operation of the conventional solid-state image pickup apparatus in FIG. 8.

The fourth embodiment will be described below. FIG. 7 is an equivalent circuit diagram which can practice the fourth embodiment of the present invention. The same reference numerals as in FIG. 3 or 6 denote the same parts in FIG. 7, and a detailed description thereof will be omitted.

Referring to FIG. 7, the circuit includes operational amplifiers 32. In the fourth embodiment shown in FIG. 7, the Darlington emitter follower 35 in FIG. 3 is replaced with a voltage follower 37, and the drive operation of the fourth embodiment is the same as that of the second or third embodiment. An input voltage to the voltage follower 37 is almost equal to its output voltage, so that a carrier accumulation potential corresponding to a light amount can be directly transferred to a corresponding accumulation capacitance 7 without reducing this carrier accumulation potential.

In each of the first to fourth embodiments described above, a photoelectric conversion pixel of the present invention is of an amplification type using a bipolar transistor. However, the photoelectric conversion pixel need not be limited to this type. For example, even in a MOS pixel or an amplification pixel using a SIT, JFET, or MOS transistor, each output line voltage of the present invention can be amplified in the same manner as described above, provided that the output line 5 is set in a floating state upon outputting the pixel signal.

If the pixel reset level can be defined by an output line potential, an external light component and the like can be removed without using any memory according to the present invention. The third embodiment shown in FIG. 6 according to the present invention can facilitate the manufacture of a photoelectric conversion apparatus in a pixel using a MOS transistor or a JFET, as compared with other embodiments.

In addition, each embodiment described above has exemplified photoelectric conversion elements of 2 rows×2 columns. However, the present invention can be applied to an image sensor and a line sensor. In particular, the speed of the scanning circuits and the accumulation switching speed of the pixels must be increased in the second embodiment by a time required for accumulating and writing an external component. This can also be applied to detection of only an increment in comparison between two light amounts for calibration or photometry of internal noise and variations in the photoelectric conversion apparatus in addition to the external component removal.

As described above, according to the present invention, since the load capacitance charged in outputting data from the photoelectric conversion pixel can be reduced, an S/N ratio can be increased, and a gain can be set high. Therefore, the magnitude of a signal to be transferred to the final preamplifier can be set high prior to the transfer, and a decrease in signal which is caused by the capacitive division involved in this transfer can be compensated.

According to the second embodiment, an output obtained by multiplying each pixel output with a gain (−1) is output to each output line to reset the corresponding pixel with respect to the output line potential, so that an inverted component of the pixel output can be written in the pixel. Therefore, an external component can be removed as in photometry without using a field memory used in the conventional method. In addition, the variation components of the pixels can be removed in the removal of the external light, thereby providing a high-performance photoelectric conversion apparatus having a high S/N ratio.

Figure 13:
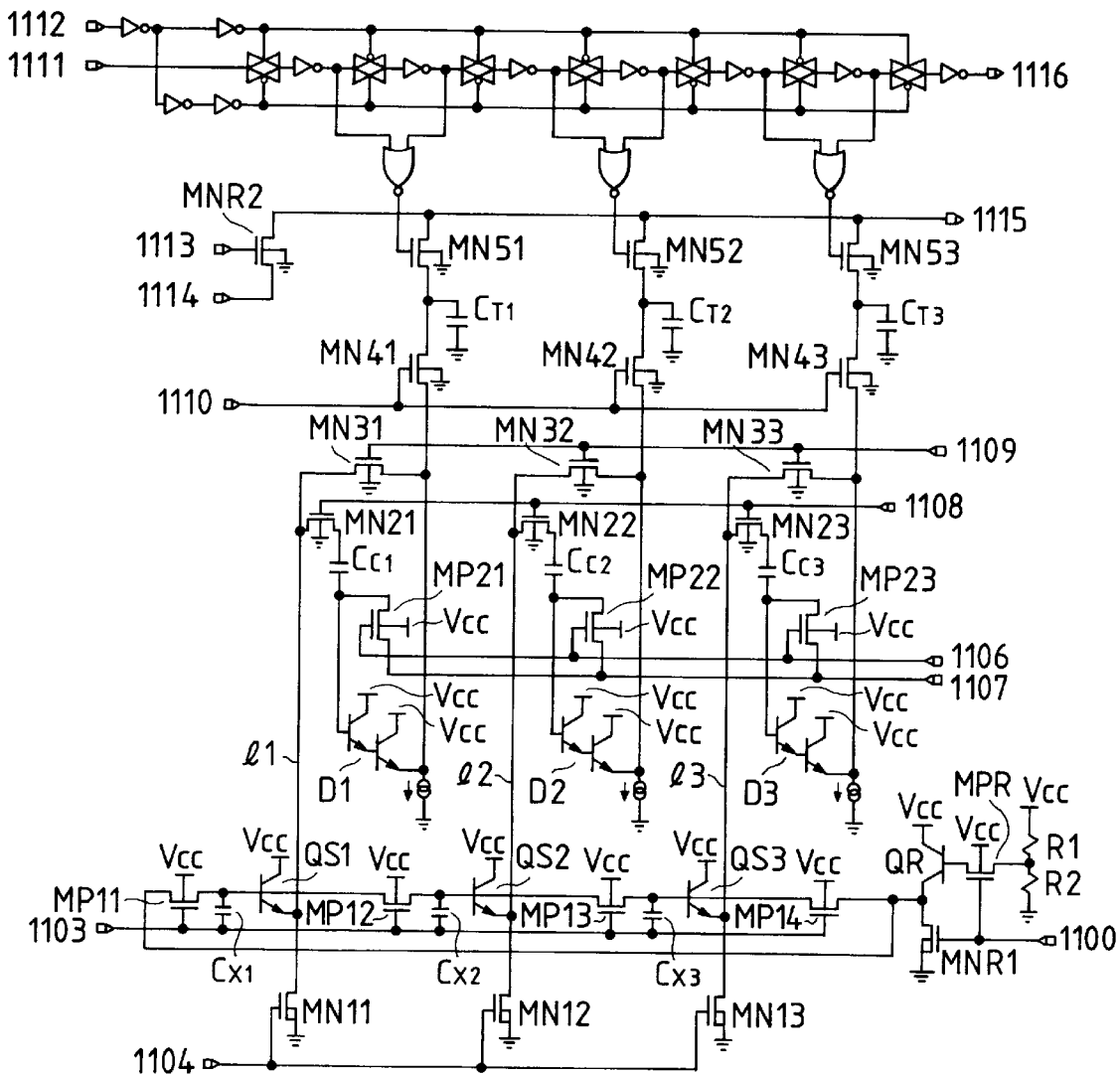
FIG. 13 is a schematic equivalent circuit diagram of the fifth embodiment according to the present invention.

FIG. 13 is a schematic circuit diagram of the fifth embodiment of the present invention. This embodiment uses three bipolar photoelectric conversion elements as photoelectric conversion elements arranged in a one-dimensional array.

Figure 14:
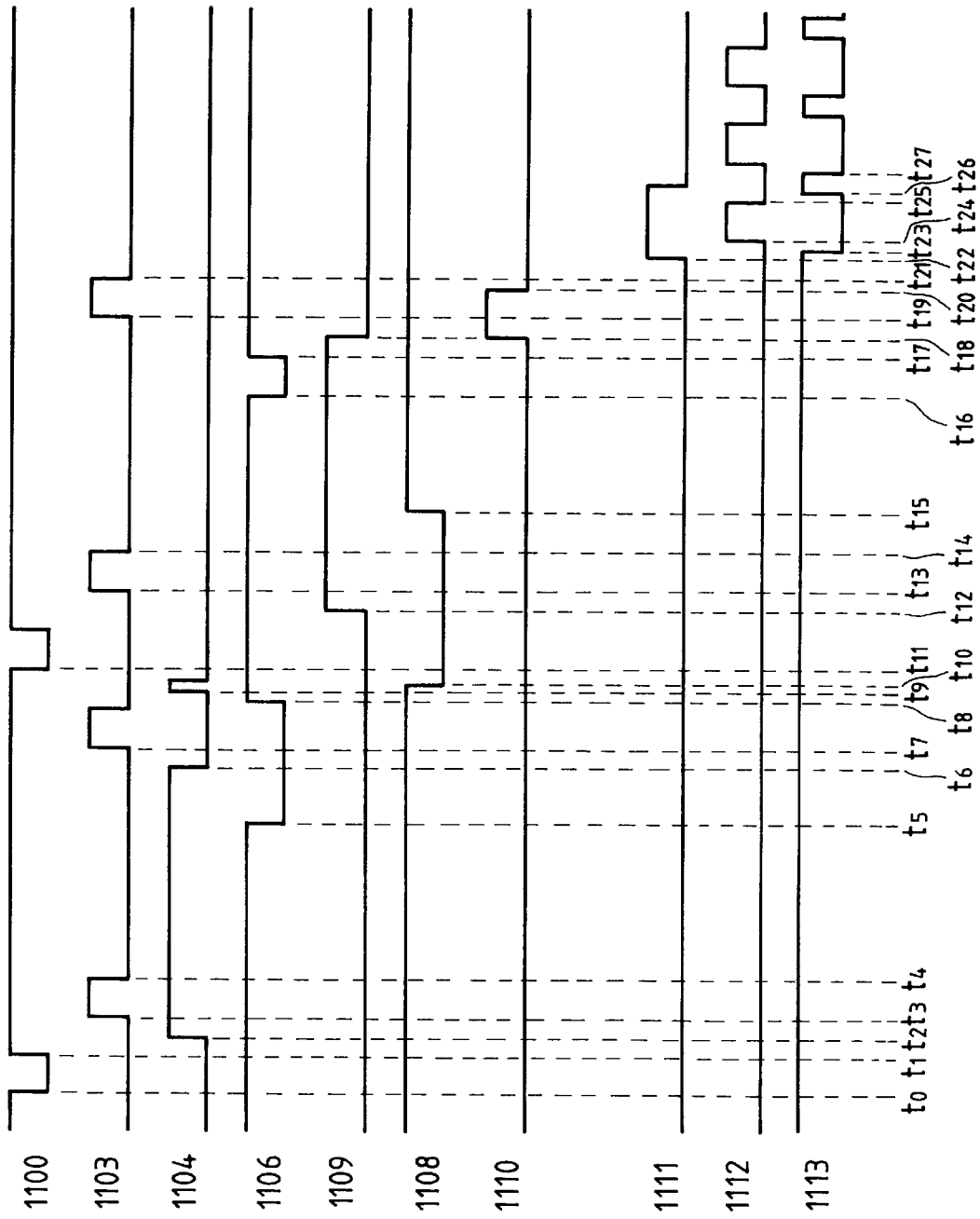
FIG. 14 is a timing chart for explaining the operation of the fifth embodiment in FIG. 13.

The operation of this embodiment will be briefly described with reference to a timing chart in FIG. 14.

At time $t_0$, when a pulse of low level is applied to a terminal 1100, a PMOS transistor MPR is turned on, and at the same time an NMOS transistor MNR1 is turned off, and a voltage (to be referred to as VRES) lower by VBE from a voltage obtained by dividing a power supply voltage across resistors R1 and R2 appears at the emitter terminal of an npn transistor QR. At this time, a terminal 1103 is set at low level. When the resistors R1 and R2 are designed to satisfy the following condition:

VRES>VTH of PMOS transistors MP11 to MP14 (where VTH is the threshold voltage of each PMOS transistor), the PMOS transistors MP11 to MP14 are turned on to set the base region of each photoelectric conversion element to the emitter voltage of npn transistors QS1 to QS3 (first reset). At time $t_1$, when the pulse at the terminal 1100 goes high, both the PMOS transistor MPR and the npn transistor QR are turned off, and at the same time the NMOS transistor MNR1 is turned on. The emitter terminal of the npn transistor QR is set at the GND potential, and the PMOS transistors MP11 to MP14 are turned off, thereby completing the first reset.

At time $t_2$, when a pulse of high level is applied to a terminal 1104, NMOS transistors MN11 to MN13 are turned on, and the emitter potential of the npn transistors QS1 to QS3 of the respective pixels is reset to a reset potential (GND in FIG. 13). At time $t_3$, when a pulse of high level is applied to the terminal 1103, the PMOS transistors MP11 to MP14 are kept off, and the base potential of the npn transistors QS1 to QS3 is increased by capacitive coupling through base capacitances Cx1 to Cx3, so that the base-emitter voltage is forward-biased, and the npn transistors QS1 to QS3 perform the emitter follower operations. The holes in the base region in the floating state are recombined. As a result, the base voltage is reset (second reset). Upon completion of this reset operation, at time $t_4$, a pulse at the terminal 1103 falls to low level, and the base potential of each pixel is shifted negative. The base-emitter voltage is then reverse-biased to start the accumulation operation at this time.

When a predetermined accumulation has elapsed, and a pulse at a terminal 1106 goes low at time $t_5$, PMOS transistors PM21 to PM23 are turned on to reset clamp capacitances Cc1 to Cc3 to a voltage applied to a terminal 1107. At time $t_6$, a pulse at the terminal 1104 goes low, the NMOS transistors MN11 to MN13 are turned off, and the emitters of the npn transistors QS1 to QS3 are set in the floating state. When a pulse of high level is applied to the terminal 1103 at time $t_7$, the base potential of each potential is shifted positive through a corresponding one of the base capacitances Cx1 to Cx3, and the base-emitter voltage of the npn transistors QS1 to QS3 is forward-biased. The signals photoelectrically converted by the pixels and accumulated in the base regions are read out onto output lines 111 to 113 and supplied to the clamp capacitances Cc1 to Cc3 through the NMOS transistors MN21 to MN23.

When the read-out operation is completed, a pulse at the terminal 1106 is set high at time $t_8$, and the PMOS transistors MP21 to MP23 are turned off to set the bases of Darlington transistors D1 to D3 in the floating state. At time $t_9$, when a pulse of high level is applied to the terminal 1104, the output lines 111 to 113 are reset, and at the same time, the base and emitter potentials of the transistors D1 to D3 Darlington-connected through the clamp capacitances Cc1 to Cc3 are shifted negative by magnitudes corresponding to signals of the respective pixels. At time $t_{10}$, a pulse at a terminal 1108 falls to turn off the NMOS transistors MN21 to MN23. After the clamp capacitances Cc1 to Cc3 are disconnected from the output lines 111 to 113, and a pulse at the terminal 1104 falls, the first reset is performed at time $t_{11}$. At this time, at time $t_{12}$, a pulse of high level is applied to a terminal 1109 to turn on NMOS transistors MN31 to MN33. At time $t_{13}$, when a pulse of high level is applied to the terminal 1103, the bases of the npn transistors QS1 to QS3 of the respective pixels are initialized in accordance with signal voltages obtained by the previous accumulation because the second reset is performed for the emitter potentials of the Darlington transistors D1 to D3 through the NMOS transistors MN31 to MN33. At this time, the higher the previous read-out signal voltage is, the lower the rest voltage becomes.

Upon completion of the second reset and the second signal accumulation, the base potential of the Darlington transistors D1 to D3 is initialized from time $t_{16}$ to time $t_{17}$. At time $t_{18}$, a pulse at the terminal 1109 falls, a pulse of high level is applied to a terminal 1110, and NMOS transistors NM41 to NM43 are turned on. At time t19, when a pulse at the terminal 1103 rises, voltages corresponding to the respective pixel signals are read in capacitances CT1 to CT3. From time $t_{22}$, when a start pulse and a scanning pulse are respectively input from terminals 1111 and 1112 to the horizontal scanning circuit, the pixel signal is time-serially read out to an output terminal 1115. Although not illustrated, an output buffer means is arranged at the output terminal 1115.

As described above, according to the present invention, two reset/accumulation/read-out cycles are performed for one period. To set the next sensor reset voltage on the basis of the previous read-out signal level, when the first signal accumulation cycle is set in, e.g., the dark state, an FPN-removed signal can be obtained. In the first signal accumulation cycle, even if external light is incident on an object, its external component can be removed.

In the above description, a signal of $(V_2-V_1)$ is output if the signals obtained in the first and second accumulation cycles are defined as $V_1$ and $V_2$. However, the signal of $(V_1+V_2)$ can also be obtained by partially changing the drive timings of the clamp circuit. According to this scheme, the signal $V_1$ obtained in the first accumulation cycle is read out. If a signal amount is insufficient as a result of this read-out operation, the second accumulation cycle is performed for the signal $V_1$ again, thereby facilitating optimization of an exposure amount (accumulation time).

In the above embodiment, each pixel has been constituted by a one-dimensional array of three pixels. Even if a plurality of pixels are arranged as a line sensor, this peripheral circuit can be arranged in the same manner as described above. In particular, a clamp capacitance, its peripheral Darlington transistor, an NMOS transistor, and a PMOS transistor are arranged in units of columns. Therefore, the two reset/accumulation/read-out cycles are performed for each period to obtain a predetermined effect.

Figure 15:
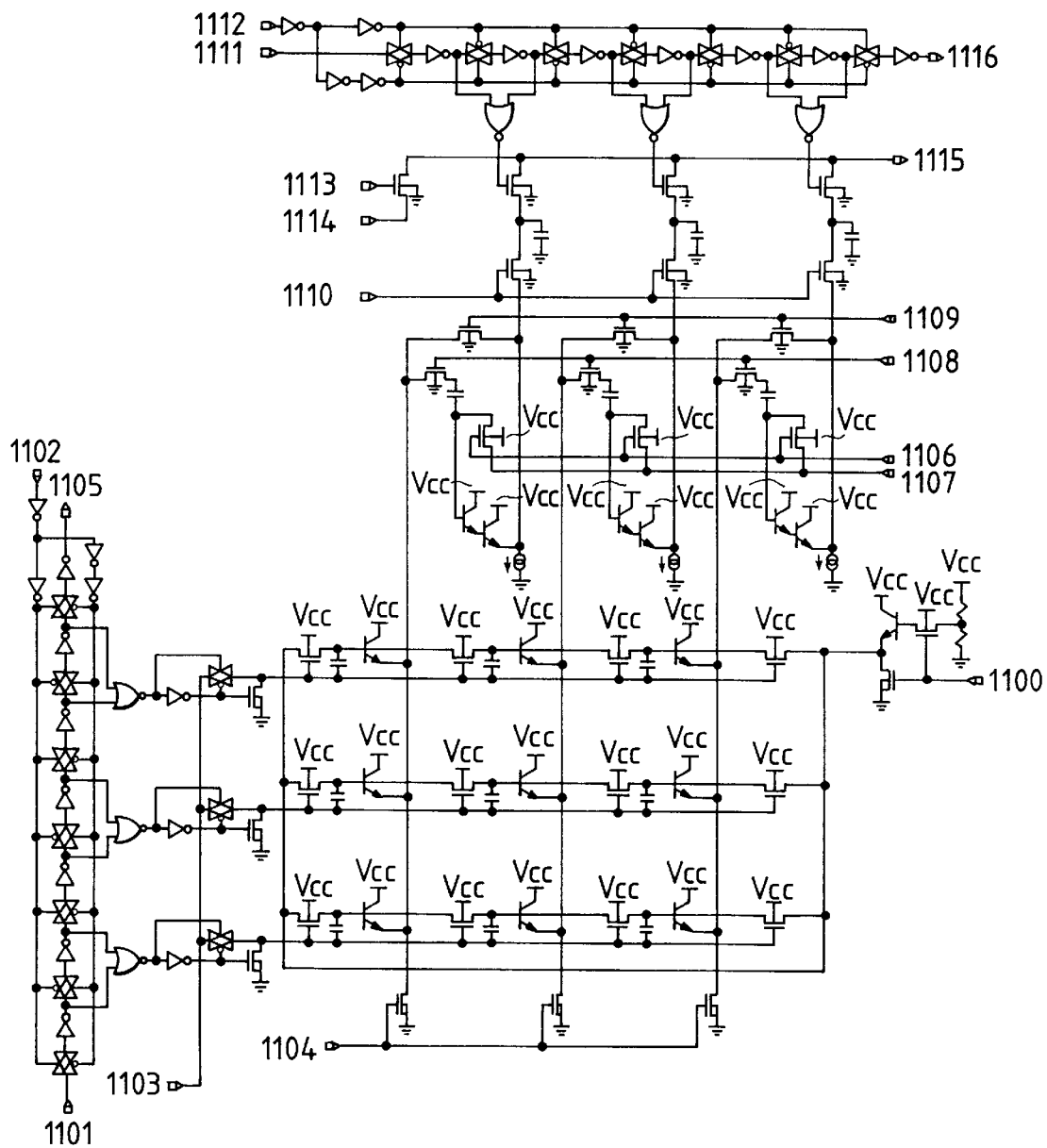
FIG. 15 is a schematic equivalent circuit diagram of the sixth embodiment according to the present invention.

FIG. 15 is a schematic circuit diagram of the sixth embodiment of the present invention. This embodiment is obtained such that photoelectric conversion elements are arranged in a two-dimensional array of three vertical pixels and three horizontal pixels with respect to the fifth embodiment. The sixth embodiment is substantially the same as the fifth embodiment except that the pixels are driven by outputs from a vertical shift register.

In this embodiment, a timing signal to a terminal 1103 of the fifth embodiment is used to supply a predetermined voltage to the terminal 1103 and switch a supply voltage at the terminal 1103 in accordance with start and timing signals from a start signal terminal 1101 and a vertical scanning timing terminal 1102 to the vertical scanning circuit, thereby reading output signals in units of horizontal drive lines. The two reset/accumulation/read-out cycles are performed for one period, and the next sensor reset voltage is set on the basis of the previous read-out signal level.

Although the fifth embodiment can perform the so-called FPN removal by the line sensor, the sixth embodiment can remove two-dimensional pattern FPN. The present invention is not limited to an array of three rows and three columns, but can be extended to a high-density area sensor of, e.g., 640 rows×460 columns, thereby obtaining low-noise, high-density image signal having a high S/N ratio.

Figure 12:
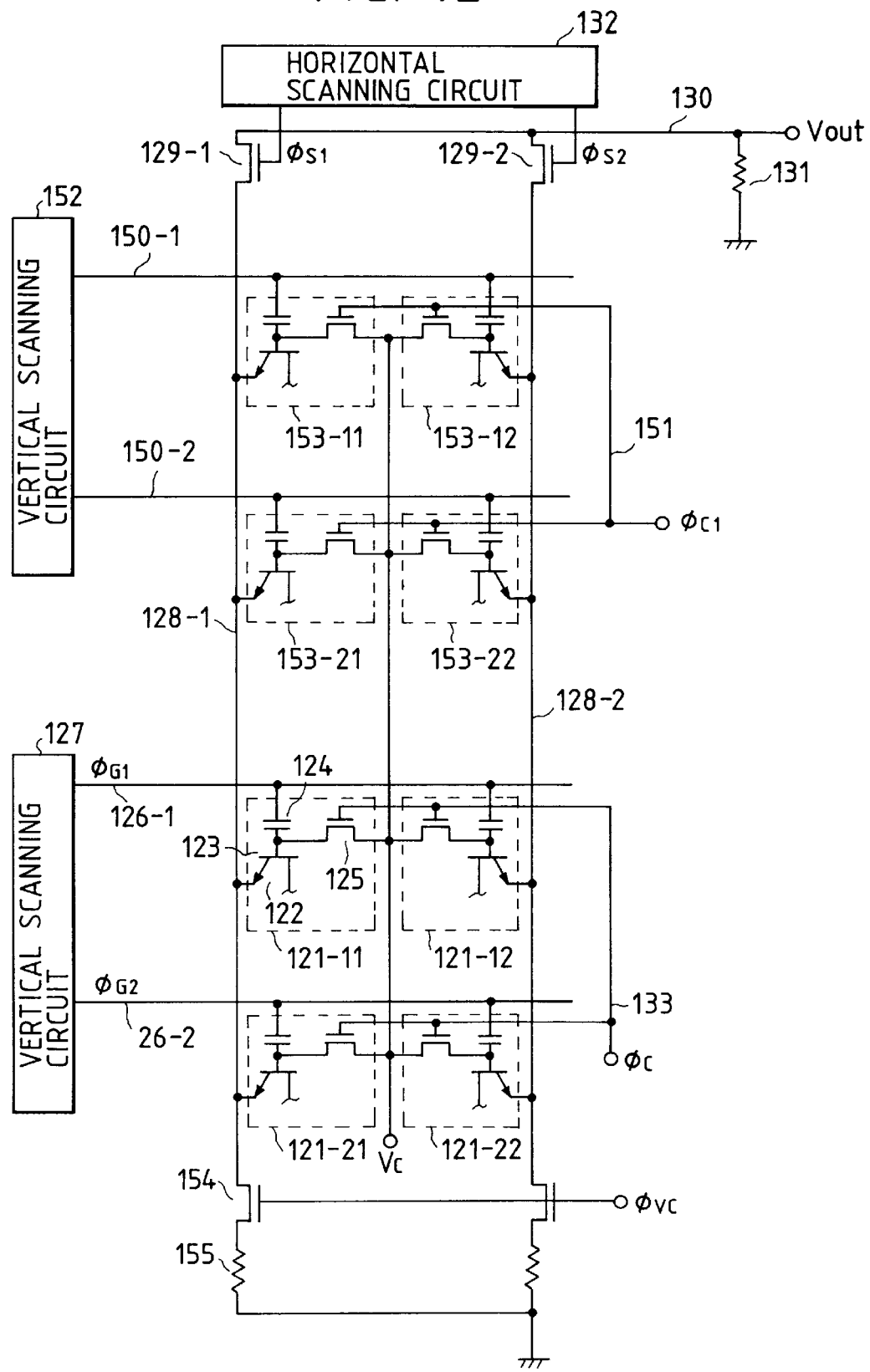
FIG. 12 is a schematic equivalent circuit diagram of another conventional solid-state image pickup apparatus.

According to this embodiment, since the memory cells 153-11 to 153-22 and the vertical scanning circuit 152 in FIG. 12 can be omitted, the chip size can be greatly reduced.

Figure 16:
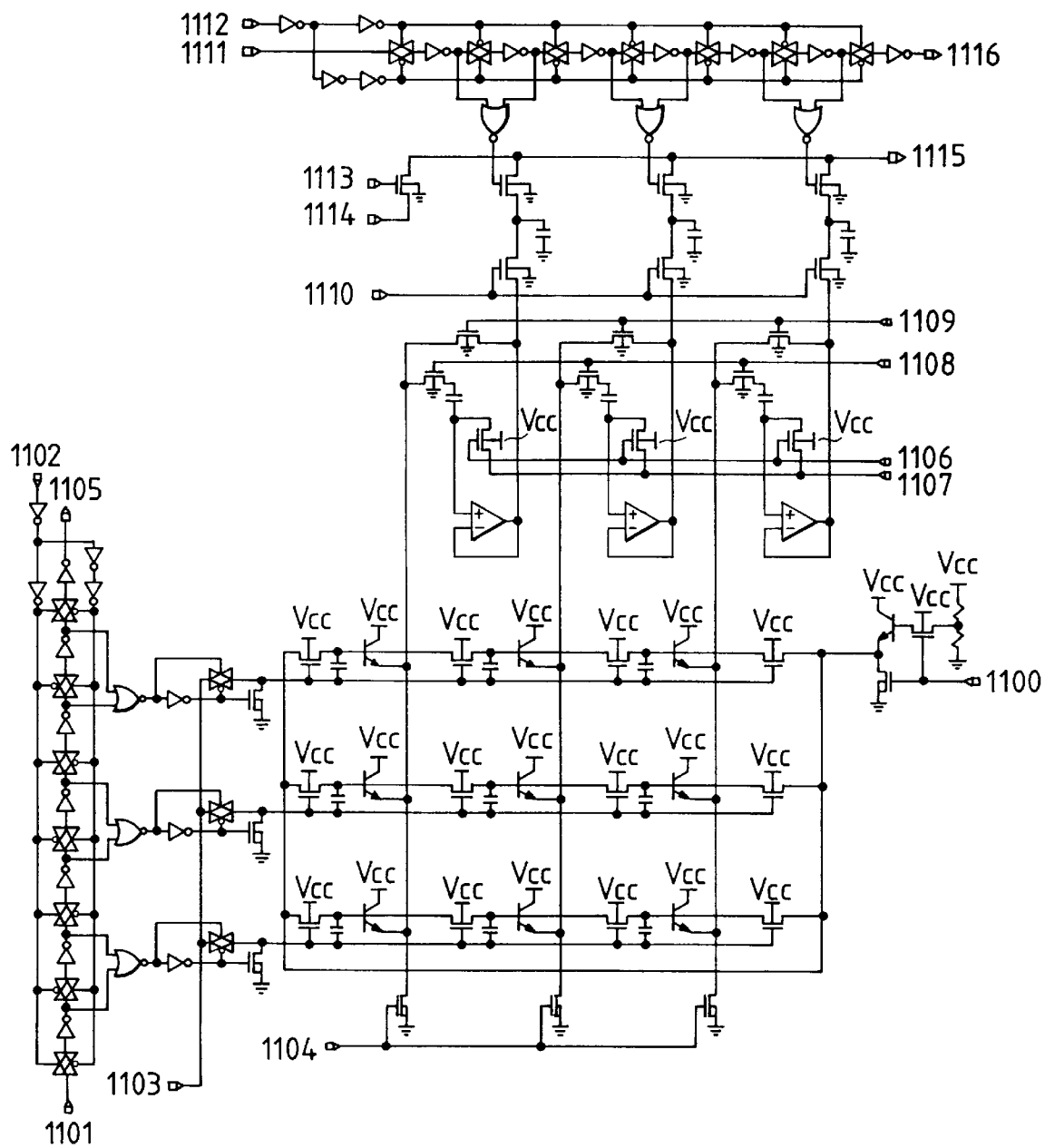
FIG. 16 is a schematic equivalent circuit diagram of the seventh embodiment according to the present invention.

In the fifth and sixth embodiments, the Darlington-connected npn transistors are used for outputs of the clamp capacitances Cc1 to Cc3. However, an OP amplifier shown in FIG. 16 can be used instead without any problem.

In the seventh embodiment, the OP amplifier is incorporated as a voltage follower, an input impedance is high, and an effective output resistance is extremely low. For these reasons, a predetermined voltage is applied to a terminal 1107, and a timing pulse is supplied to a terminal 1106 to turn on/off each PMOS transistor, thereby accurately transferring a read-out level. Even in this embodiment, two reset/accumulation/read-out cycles are performed for each period in units of horizontal drive lines, and the next sensor reset voltage is set on the basis of the previous read-out signal level.

Figure 17:
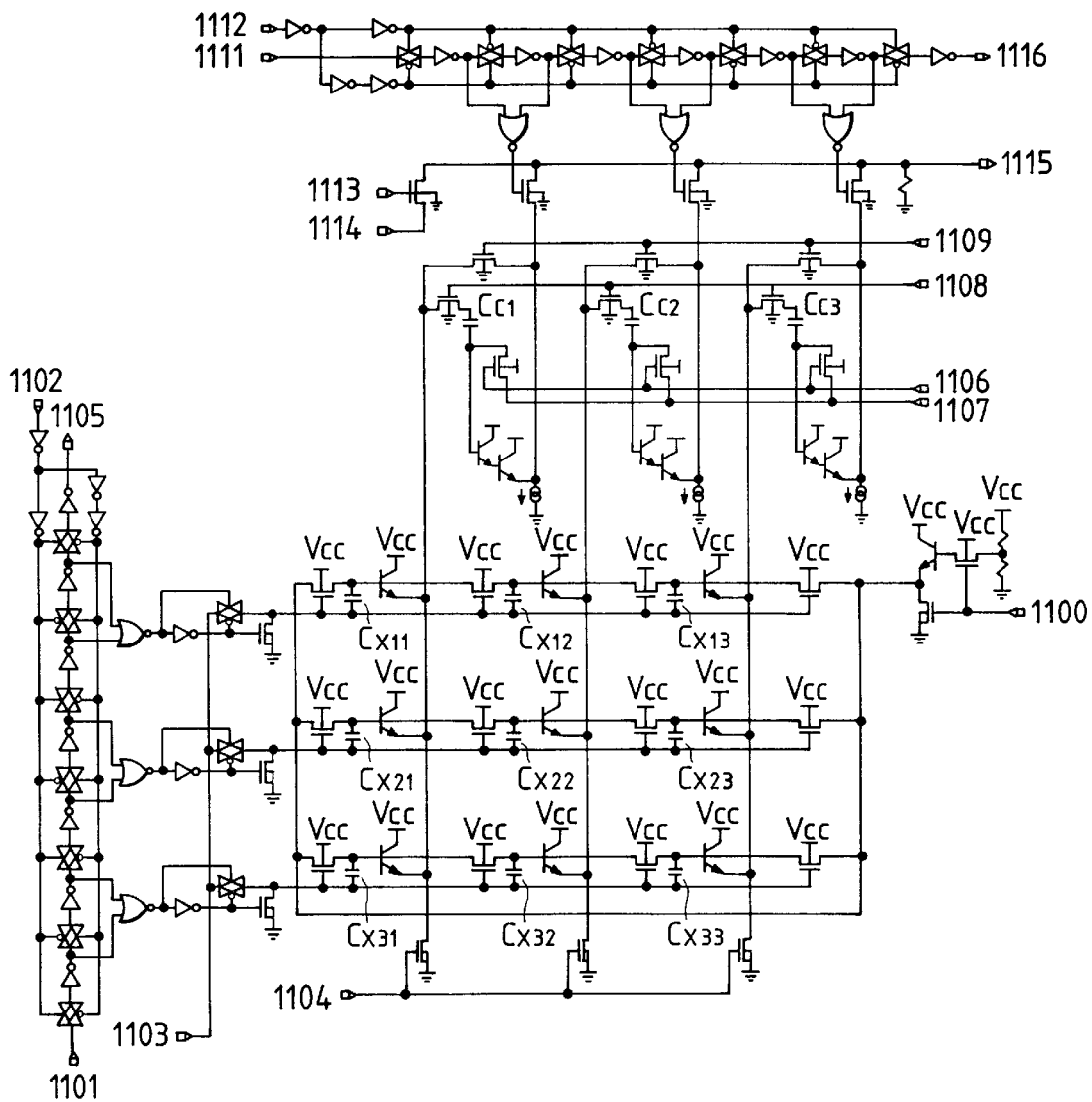
FIG. 17 is a schematic equivalent circuit diagram of the eighth embodiment according to the present invention.

The eighth embodiment according to the present invention is shown in FIG. 17. This embodiment is an improvement of the sixth embodiment. The transfer switches NM41 to NM43 and the signal holding (clamp) capacitances CT1 to CT3 are omitted, and a load resistor RL is connected to each horizontal output line. With this arrangement, since the capacitances and MOS switches can be omitted from the chip, the chip size can be reduced. Transfer from base capacitances Cx11 to Cx13 to clamp capacitances Cc1 to Cc3 can be performed at high speed, and high-speed scanning can be performed in outputting the charges from the clamp capacitances Cc1 to Cc3.

A current flowing through the resistor RL in the signal read-out can be given:

$$VS/RL \tag{1}$$

where VS is the signal voltage.

On the other hand, when the read-out time is defined as $\Delta T$, a change amount $\Delta VB$ of the base voltage of the Darlington transistor during the read-out operation can be represented by the following equation:

$$\Delta VB=(VS/RL)\times(\Delta T/Cc)/HFE^2 \tag{2}$$

where HFE is the current amplification factor of the npn transistor, and Cc is the capacitance of each of the clamp capacitances Cc1 to Cc3.

When the load resistor RL, the signal holding (clamp) capacitance Cc, and the like are set to sufficiently reduce the value in equation (2), a stable output can be obtained. A transfer gain AT for transfer from an accumulation capacitance CT to a stray capacitance CH as of the horizontal output line is given as follows in FIGS. 13, 15, and 16:

$$AT=CH/(CT+CH) \tag{3}$$

Thus, according to the present embodiment, large reduction of chip size can be attained, while larger accumulation capacitance is required to obtain larger transfer gain in the prior art.

Figure 18:
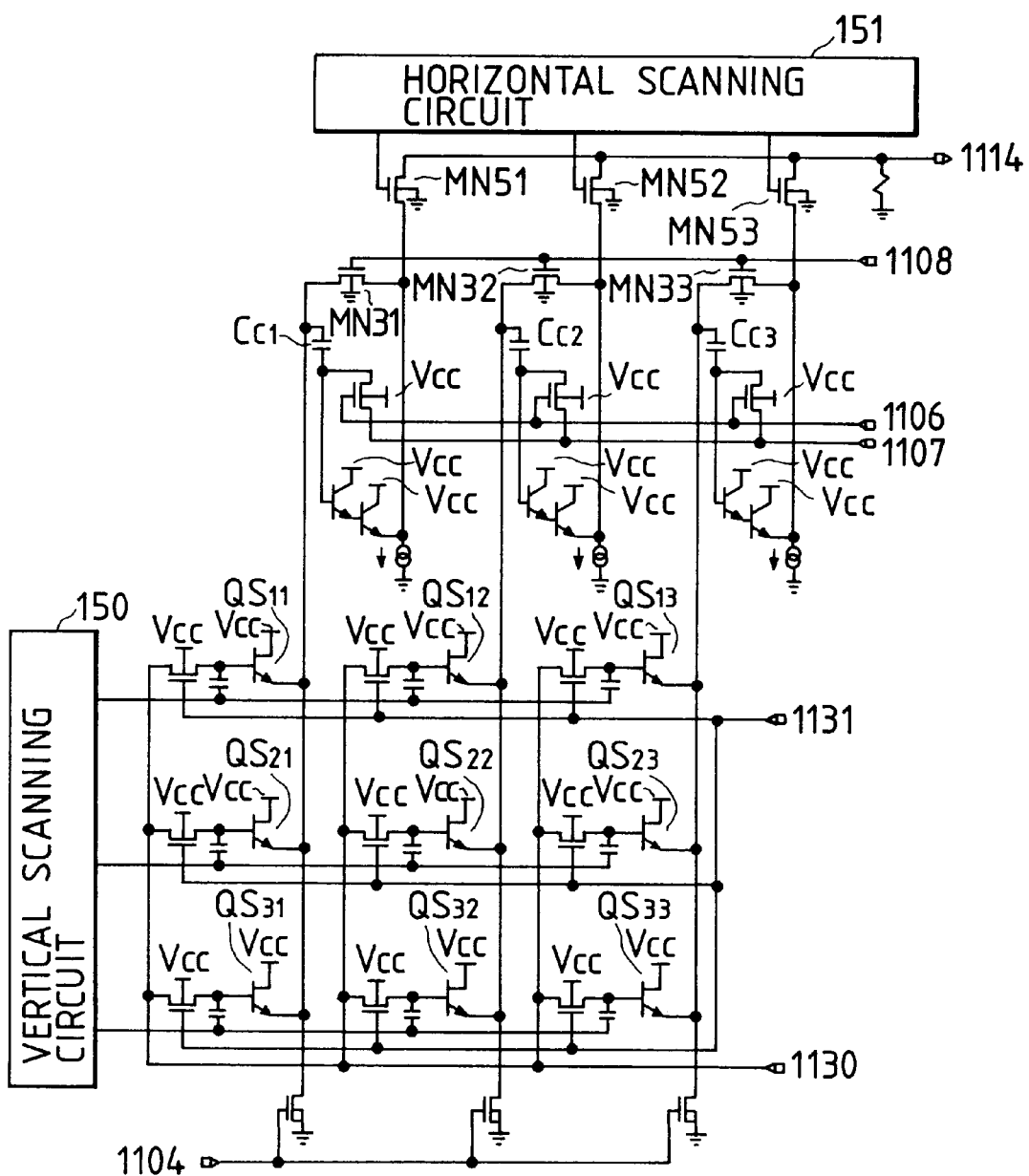
FIG. 18 is a schematic equivalent circuit diagram of the ninth embodiment according to the present invention.

FIG. 18 is a schematic equivalent circuit diagram of the ninth embodiment of the present invention. In this embodiment, SITs (Static Induction Transistors) QS11 to QS33 are used as the photoelectric conversion elements. The operation of the ninth embodiment is identical to that of the sixth embodiment. That is, in signal read-out from a SIT in the sensor, an output from a vertical scanning circuit 150 is set to an intermediate level voltage, and a clamping operation is performed. A clamp output passes through NMOS transistors NM31 to NM33 and is fed back to the sourcer of the SIT. When the output from the vertical scanning circuit 150 is then set at high level, the SIT gate voltage VGS is defined as follows:

$$VGS=FB+\phi B \tag{4}$$

where FB is the clamped output of the Darlington transistor, and $\phi B$ is the built-in potential in the gate-source path of the SIT.

When the reset voltage (terminal 1107) of the clamp capacitances Cc1 to Cc3 is set to an appropriate value, signal accumulation can be newly performed from the clamp output voltage.

In this embodiment, photoelectric conversion elements arranged in an array as a two-dimensional area sensor may be used, as a matter of course. Two reset/accumulation/read-out cycles are performed for each period in units of horizontal drive lines, and the next sensor reset voltage is set on the basis of the previous read-out signal level in the same manner as in the above embodiment. In this manner, the two-dimensional pattern FPN can be removed, and a low-noise, high-density image signal having a high S/N ratio can be obtained.

The present invention has been described by exemplifying bipolar photoelectric convention elements and the SIT photoelectric conversion elements. However, the same operation as described above can be performed in any other photoelectric conversion element.

According to the present invention, in a solid-state image pickup device, even if a large number of photoelectric conversion elements are integrated to assure a high resolution, solid-state pattern noise can be reduced, and the chip size can be reduced.

In consideration of a detector serving as a light amount detector as an application of the photoelectric conversion element of the present invention, a so-called external light removal function capable of extracting a target object even in a dim state with high precision can be enhanced, and the chip size can be reduced.

Figure 19:
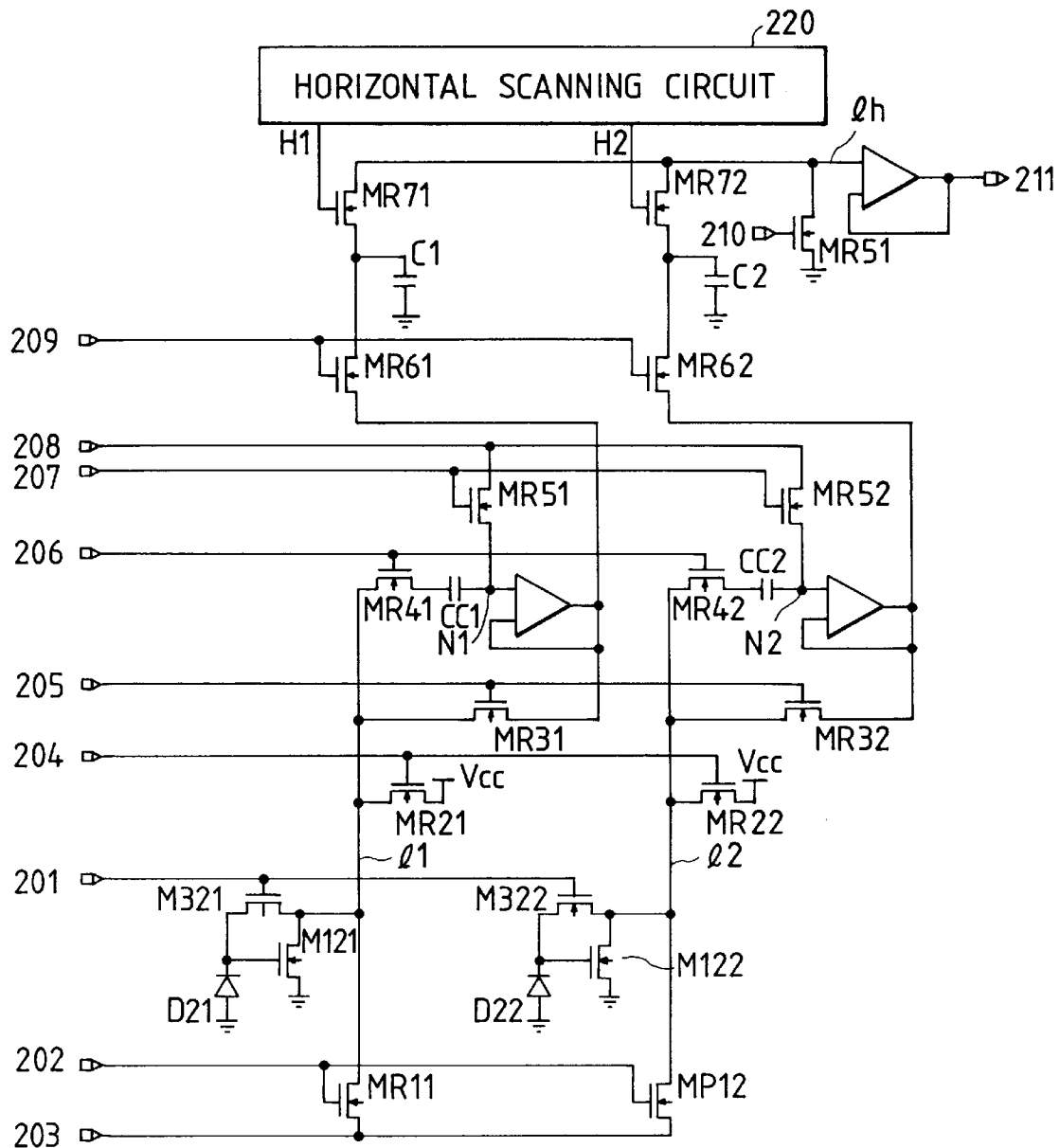
FIG. 19 is a schematic equivalent circuit diagram of the 10th embodiment of the present invention.

The 10th embodiment of the present invention is shown in FIG. 19.

Figure 20:
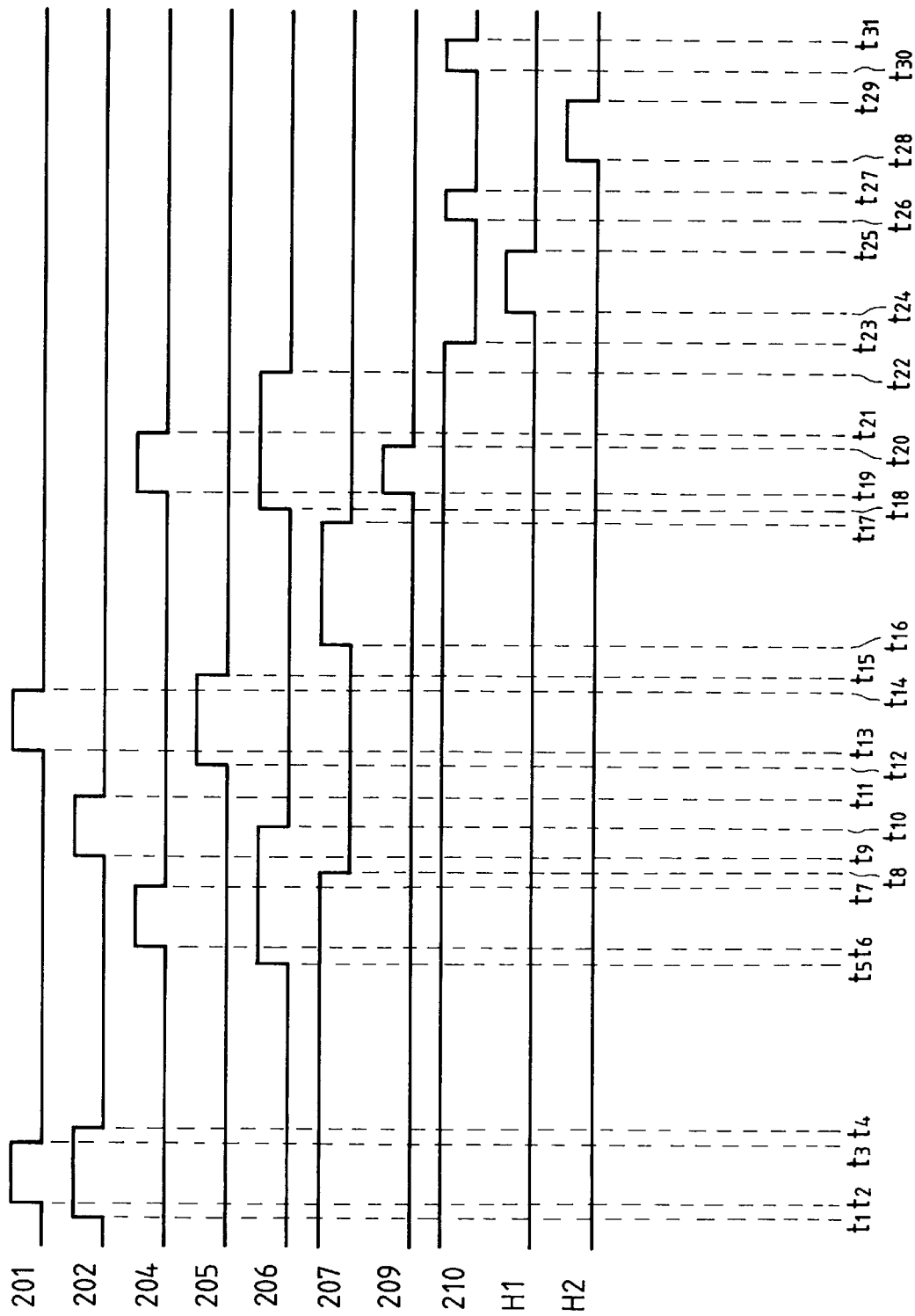
FIG. 20 is a timing chart for explaining the operation of the 10th embodiment of the present invention.

This embodiment exemplifies a one-dimensional photoelectric conversion apparatus consisting of two pixels for the descriptive convenience. One pixel is constituted by a photodiode and two NMOS transistors. The operation of this embodiment will be briefly described with reference to a timing chart in FIG. 20.

At time t0, after a pulse of high level is applied to a terminal 202, a pulse of high level is applied to the terminal 202 at time t1. At each timing, NMOS transistors MR11 and MR12 and M321 and M322 are turned on, and photodiodes D21 and D22 of the respective pixels are reset with a voltage Vres applied to a terminal 203. Upon completion of resetting, the respective pulses go low at time t3 and time t4, and the photocarrier accumulation operation (first accumulation operation) is started. In this case, the photoelectric conversion element accumulates electrons on the NMOS gate, and the gate potential decreases as the incident light amount increases.

When the accumulation operation is completed, and the optical signal of each pixel is to be read out, a pulse of high level is applied to a terminal 206 at time t5 to turn on NMOS transistors MR41 and MR42. At time t4, a pulse of high level is applied to a terminal 204 to turn on NMOS transistors MR21 and MR22. Inverting amplifiers are constituted between transistor M121 and M122 and transistors MR21 and MR22 of the respective pixels. The optical signals stored in the photodiodes are read out onto output lines 211 and 212.

At time t7, when the read-out operation of the optical signals is completed, a pulse at a terminal 207 falls at time t8 to turn off the NMOS transistors MR51 and MR52, so that amplifier nodes N1 and N2 of capacitances CC1 and CC2 are set in the floating state by the potential given at the terminal 208.

At time t9, when a pulse of high level is applied to the terminal 202 to reset the output lines 211 and 212, the voltages at the nodes N1 and N2 are shifted negative through the capacitances CC1 and CC2. In addition, at time t10 and time t11, the pulses at the terminals 206 and 202 fall to set both the terminals of the capacitances CC1 and CC2 in the floating state, and the reset MOS is turned off. At time t12, when a pulse of high level is applied to the terminal 205, the potentials at the nodes N1 and N2 are output to the output lines 211 and 212 through operational amplifiers. At time t13, when a pulse of high level is applied to the terminal 201, the respective pixels are reset to the potentials of the output lines 211 and 212.

When resetting is completed at time t14, each pixel starts the second accumulation operation. When the accumulation operation is completed, the optical signal is read out again from time t17 to time t22. At this time, when a pulse of high level is applied to a terminal 209 at time t19, the signal voltages at the nodes N1 and N2 are read out to the holding capacitances C1 and C2 through NMOS transistors MR61 and MR62. A horizontal scanning circuit 220 is then operated to serially read out the signals from the C1 and C2 to a horizontal scanning line lh and an output terminal 211 from time t23 to time 31, thereby completing the series of operations.

As described above, according to the present invention, the two reset/accumulation/read-out cycles are performed for one period, and at the same time, the next sensor reset voltage is set on the basis of the previous read-out signal level. For example, when the first signal accumulation state is set in the dark state or the accumulation time is reduced to a nonnegligible degree, a signal free from FPN including the dark current component of each pixel can be obtained. In an application as a detector, even if external light is to be directly incident on a light-receiving surface of each pixel, the external component can be eliminated upon irradiation of light from a light source such as an LED onto an object in the second accumulation period, and the detection precision can be greatly improved.

In this embodiment, when the operational amplifiers are arranged at the nodes N1 and N2 of the clamp sections. No problem is posed when another buffer means such as a source follower or an emitter follower is used in place of an operational amplifier.

Figure 21:
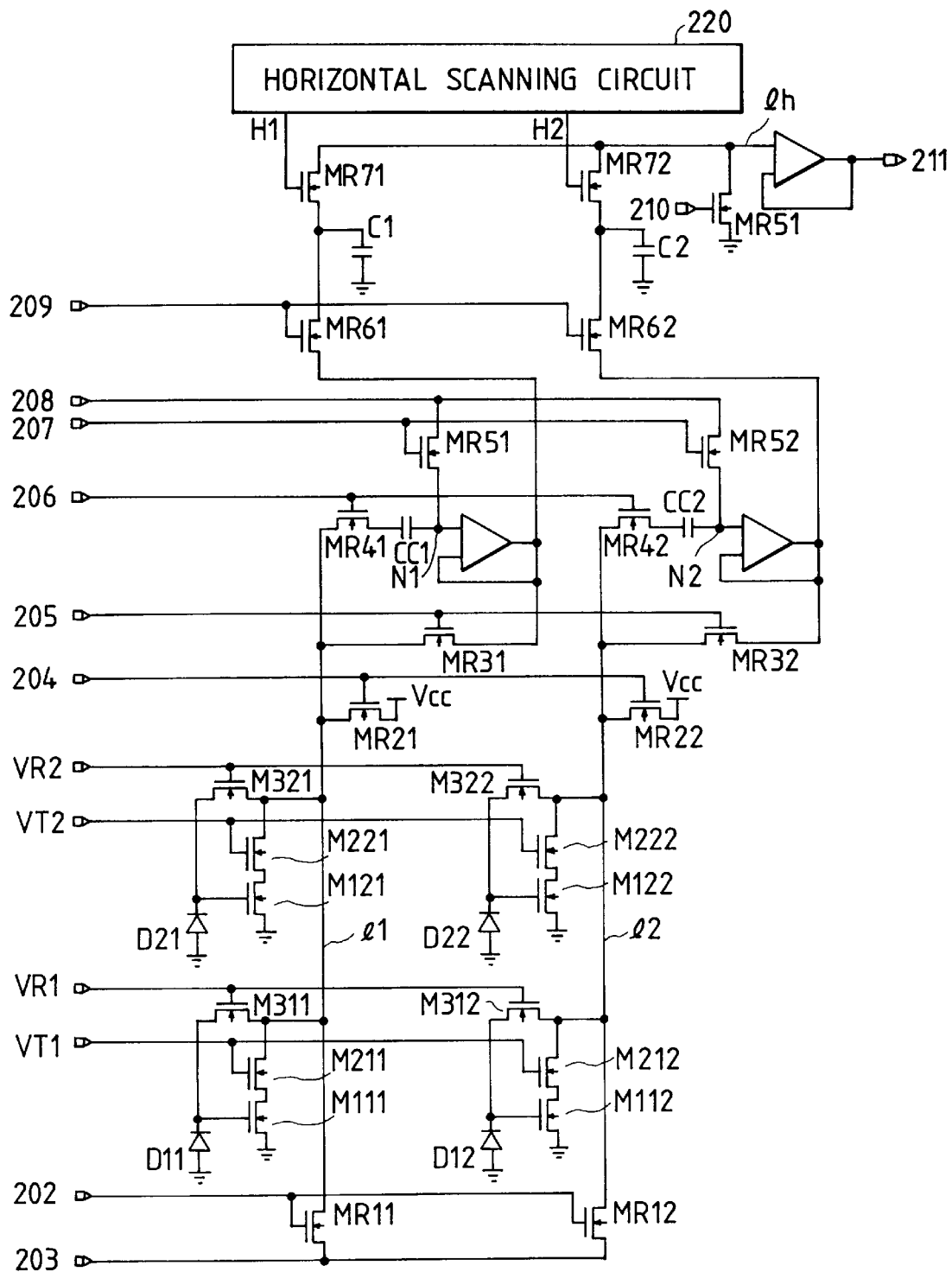
FIG. 21 is an equivalent circuit diagram of the 11th embodiment according to the present invention.

The 11th embodiment of the present invention is shown in FIG. 21. This embodiment exemplifies a two-dimensional array of photosensitive conversion elements of two vertical pixels and two horizontal pixels with respect to the 10th embodiment. The 11th embodiment is substantially the same as the 10th embodiment in that pixels are driven by outputs from a vertical shift register. In the 11th embodiment, since the memory cells 153-11 to 153-22 and the vertical scanning circuit 152 in FIG. 12 can be omitted to greatly reduce the chip size.

In the 10th and 11th embodiments, the pixel portion causes the gate electrode of an NMOS transistor to accumulate the photocarriers. In the read-out operation, a photoelectric conversion element is used as a type in which the NMOS transistor is used as an inverting amplifier. However, the same operation as described above can be realized even if another photoelectric conversion element such as a MOS, CMD, AMI, or SIT photoelectric conversion element is used.

What is claimed is:

1. A photoelectric conversion apparatus comprising:
   a photoelectric conversion element; and
   reset setting means for setting said photoelectric conversion element to a reset level by using an inverted output of an output of said photoelectric conversion element, wherein said reset level is the level of said inverted output.

2. A photoelectric conversion apparatus according to claim 1, wherein said photoelectric conversion element is for converting light into an electrical signal and outputting the electrical signal onto a signal output line through a photoelectric conversion output portion, and further comprising processing means connected to said signal output line of said photoelectric conversion element, wherein an output portion of said processing means is connected to said photoelectric conversion output portion.

3. An apparatus according to claim 2, wherein said processing means is one of an emitter follower, a source follower, and an operational amplifier.

4. An apparatus according to claim 2, wherein a switch for controlling an input potential is connected to said input section of said processing means.

5. An apparatus according to claim 2, wherein said photoelectric conversion pixel includes a base of a bipolar transistor and a pixel capacitance.

6. A photoelectric conversion apparatus including a photoelectric conversion pixel for accumulating carriers generated by an optical signal in a control electrode of a transistor and outputting an output corresponding to the optical signal from a main electrode of said transistor, comprising:
   amplifier means having a negative gain connected to an output line of each pixel of said photoelectric conversion pixel,
   connecting means for connecting an output from said amplifier means and said output line of the pixel, and
   means for resetting said control electrode of the pixel of said transistor with respect to an output from said amplifier means.

7. An apparatus according to claim 6, wherein said amplifier is one of an emitter follower, a source follower, and an operational amplifier.

8. An apparatus according to claim 6, wherein said connecting means comprises a MOS transistor controlled by a negative feedback pulse.

9. A solid-state image pickup apparatus comprising a plurality of photoelectric conversion elements, processing means connected to output terminals of said plurality of photoelectric conversion elements, switching means for connecting an output from said processing means to the output terminals of said photoelectric conversion elements, and means for resetting said photoelectric conversion elements to an output voltage from said processing means.

10. An apparatus according to claim 9, wherein said photoelectric conversion element accumulates carriers upon reception of an optical energy on said control electrode of said transistor and outputs a signal based on the carriers accumulated from a main electrode region of said transistor.

11. An apparatus according to claim 9, wherein said switching means comprises a MOS transistor.

12. An apparatus according to claim 9, wherein said resetting means includes means for resetting a control region of said photoelectric conversion element.

13. An apparatus according to claim 12, wherein said control region includes a base of a transistor.

14. An apparatus according to claim 12, wherein said control region includes a gate of a transistor.

15. A solid-state image pickup apparatus comprising a plurality of photoelectric conversion elements, a clamp capacitance and switching means which are connected to a column output line of each of said photoelectric conversion elements, resetting means for resetting said photoelectric conversion elements for connecting an output terminal of said clamp capacitance to an output terminal of said switching means, and transfer means for transferring an output from said switching means to an output line.

16. An apparatus according to claim 15, wherein said transfer means comprises an accumulation capacitance for accumulating a charge from said photoelectric conversion element through said switching means, and transfer switching means for time-serially transferring the charge of said accumulation capacitance onto said output line in accordance with a timing signal from a horizontal scanning circuit.

17. An apparatus according to claim 15, wherein said photoelectric conversion element is a bipolar or static induction photoelectric conversion element.

18. A method of driving a solid-state image pickup apparatus having a plurality of photoelectric conversion elements, processing means arranged at output terminals of the plurality of photoelectric conversion elements, and switching means for connecting one of at least two outputs from the processing means to an output terminal of the photoelectric conversion element, the other of the outputs from the processing means being a pixel signal output, comprising a resetting step for resetting the photoelectric conversion elements in accordance with output voltages from the processing means, and a step for turning off the switching means after said resetting step to output the pixel signal.

19. A method according to claim 18, wherein said photoelectric conversion element accumulates carriers generated upon reception on an optical energy in a control electrode of said transistor and outputs a signal on the basis of the accumulated carriers from a main electrode region of said transistor.

20. A method according to claim 18, wherein said processing means transfers an output from said photoelectric conversion element to an accumulation capacitance to connect a charge of said accumulation capacitance to said switching means and output the pixel signal.

21. An method according to claim 18, wherein said resetting step includes resetting a control region of the photoelectric conversion element.

22. A method according to claim 21, wherein the control region includes a base of a transistor.

23. A method according to claim 22, wherein the control region includes a gate of a transistor.

* * * * *

UNITED STATES PATENT AND TRADEMARK OFFICE
CERTIFICATE OF CORRECTION

PATENT NO.  : 5,933,188
DATED       : August 3, 1999
INVENTOR(S) : MAHITO SHINOHARA ET AL.

Page 1 of 2

It is certified that error appears in the above-identified patent and that said Letters Patent is hereby corrected as shown below:

COLUMN 3

Line 55, "$n^{30}$-type" should read --$n^+$-type--.

COLUMN 5

Line 24, "$-V\Phi_G \Delta V_{GP}$" should read -- $-V\Phi_G + \Delta V_{GP}$ --.

COLUMN 10

Line 37, "and" (second occurrence) should read --or--.

COLUMN 12

Line 67, "t19," should read --$t_{19}$,--.

COLUMN 14

Line 59, "sourcer" should read --source--.

COLUMN 15

Line 56, "transistor" should read --transistors--.

COLUMN 16

Line 21, "31," should read --t31,--.

UNITED STATES PATENT AND TRADEMARK OFFICE
CERTIFICATE OF CORRECTION

PATENT NO.  : 5,933,188

DATED       : August 3, 1999

INVENTOR(S) : MAHITO SHINOHARA ET AL.

It is certified that error appears in the above-identified patent and that said Letters Patent is hereby corrected as shown below:

<u>COLUMN 18</u>

Line 49, "An" should read --A--.

Signed and Sealed this

Twentieth Day of June, 2000

Q. TODD DICKINSON

*Attest:*

*Attesting Officer*                     *Director of Patents and Trademarks*